July 25, 1961 P. A. STEPHENSON 2,993,438
DUPLICATING MACHINES
Original Filed Feb. 4, 1957 11 Sheets-Sheet 1

INVENTOR
Paul A. Stephenson
BY
Curtis Morris + Safford
ATTORNEYS

July 25, 1961 P. A. STEPHENSON 2,993,438
DUPLICATING MACHINES
Original Filed Feb. 4, 1957 11 Sheets-Sheet 3

INVENTOR
Paul A. Stephenson
BY
Curtis Morris + Safford
ATTORNEYS

July 25, 1961 P. A. STEPHENSON 2,993,438
DUPLICATING MACHINES
Original Filed Feb. 4, 1957 11 Sheets-Sheet 4
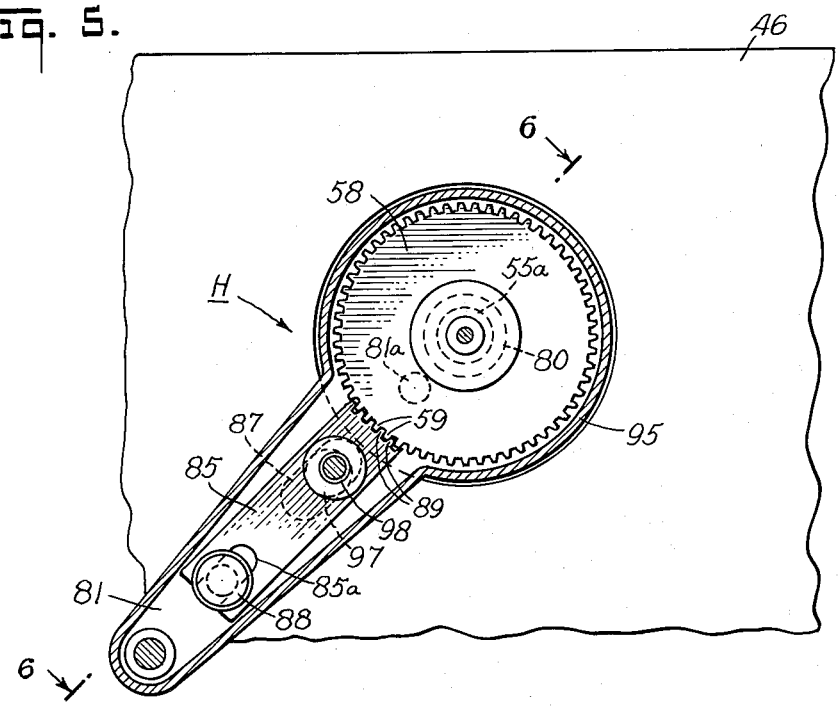
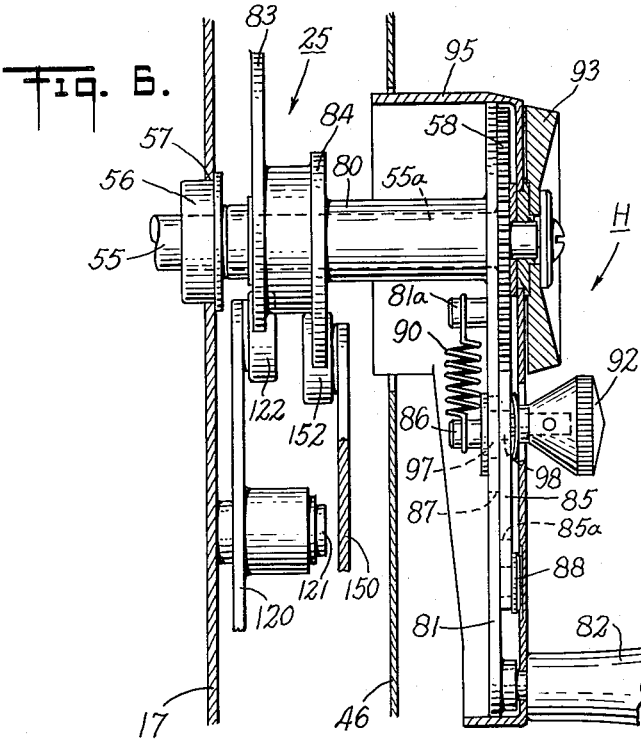
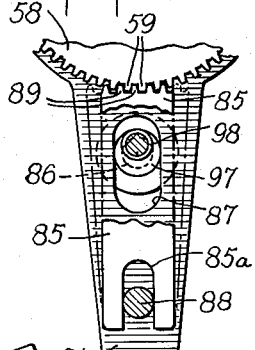
INVENTOR
Paul A. Stephenson
BY
Curtis Morris + Safford
ATTORNEYS

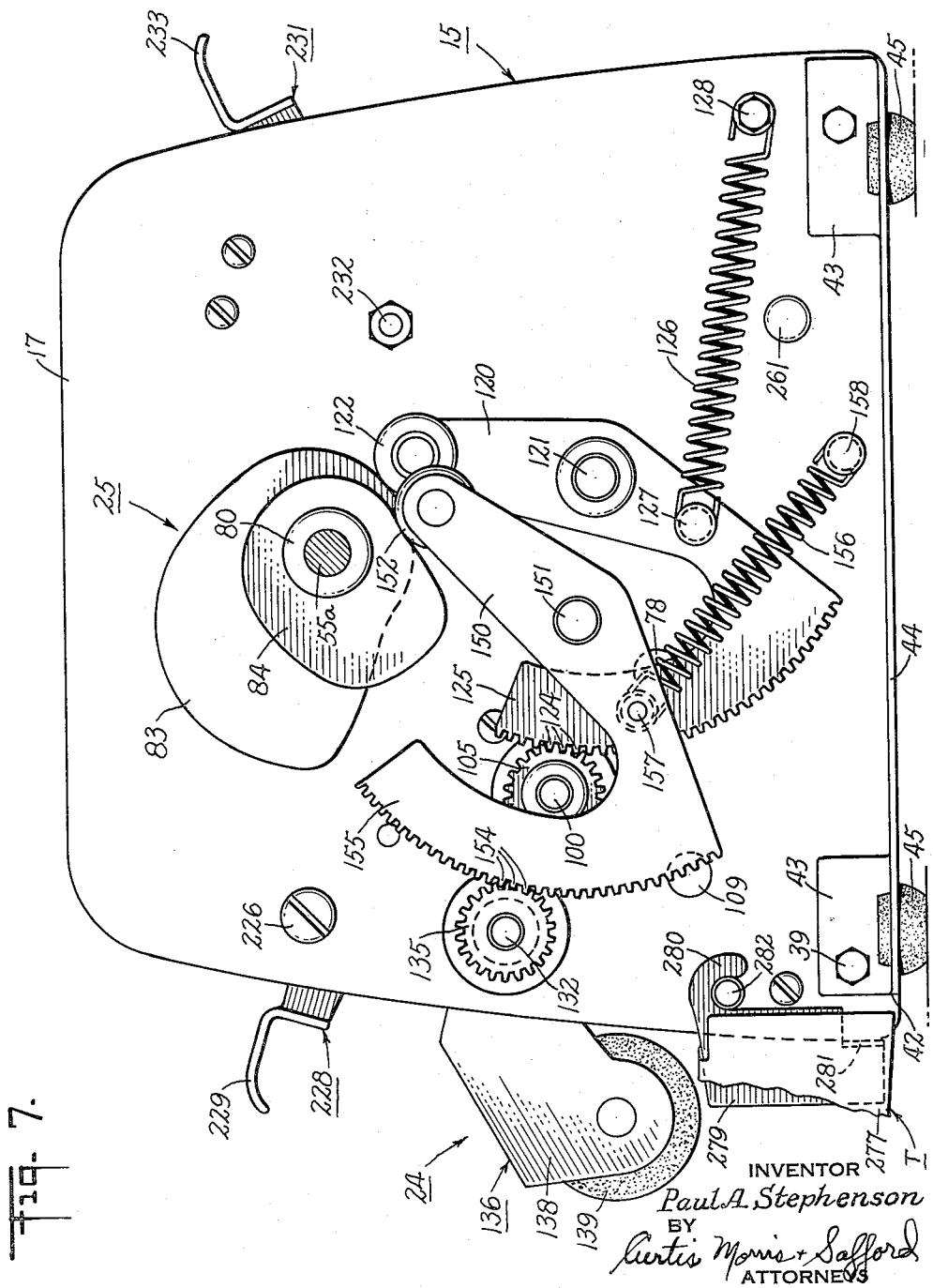

July 25, 1961 P. A. STEPHENSON 2,993,438
DUPLICATING MACHINES
Original Filed Feb. 4, 1957 11 Sheets-Sheet 6
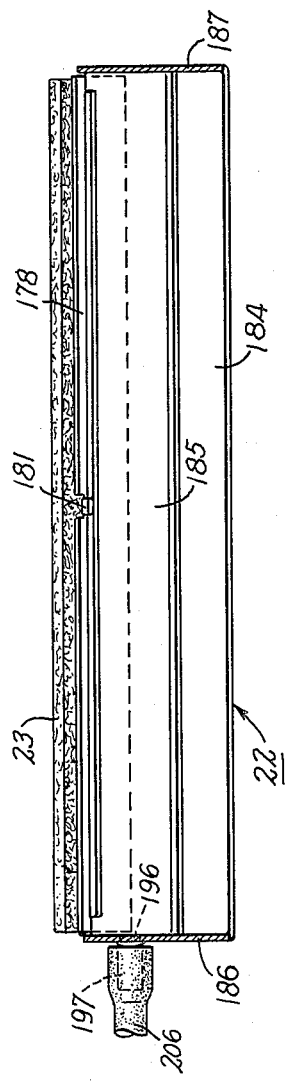
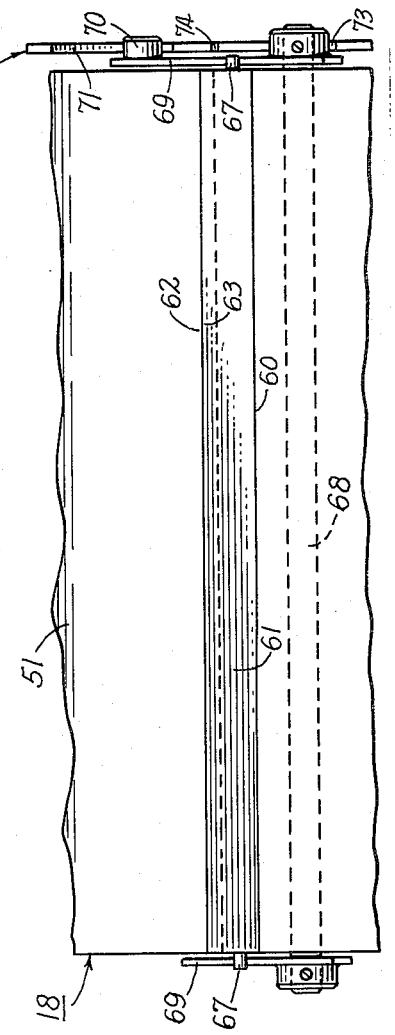
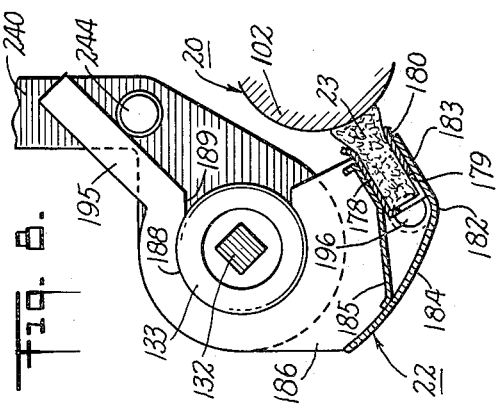
INVENTOR
Paul A. Stephenson
BY
Curtis, Morris + Safford
ATTORNEYS July 25, 1961 P. A. STEPHENSON 2,993,438
DUPLICATING MACHINES
Original Filed Feb. 4, 1957 11 Sheets-Sheet 8

INVENTOR
Paul A. Stephenson
BY
Curtis, Morris + Safford
ATTORNEYS

July 25, 1961 P. A. STEPHENSON 2,993,438
DUPLICATING MACHINES
Original Filed Feb. 4, 1957 11 Sheets-Sheet 9
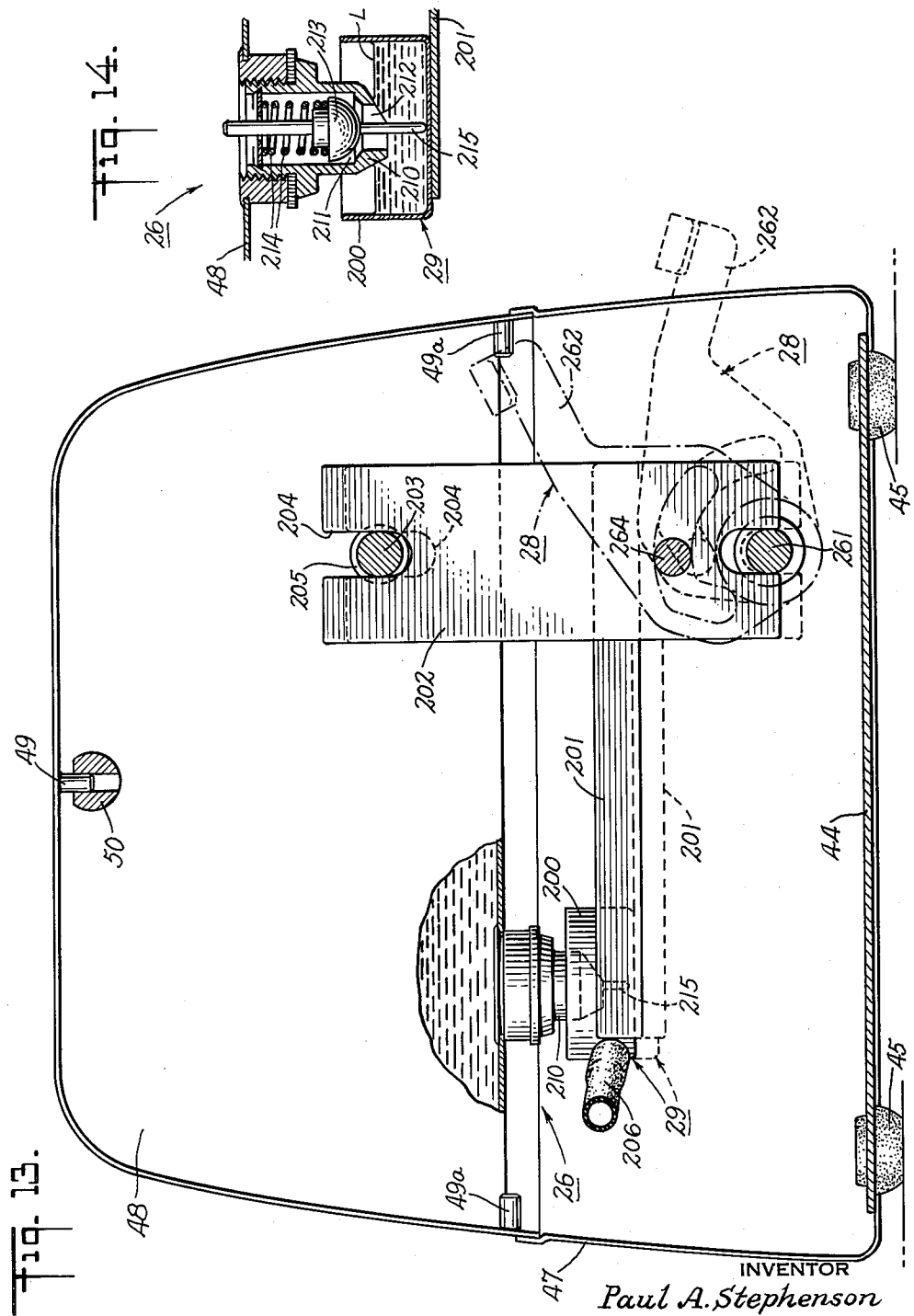
INVENTOR
Paul A. Stephenson
BY
Curtis Morris + Safford
ATTORNEYS

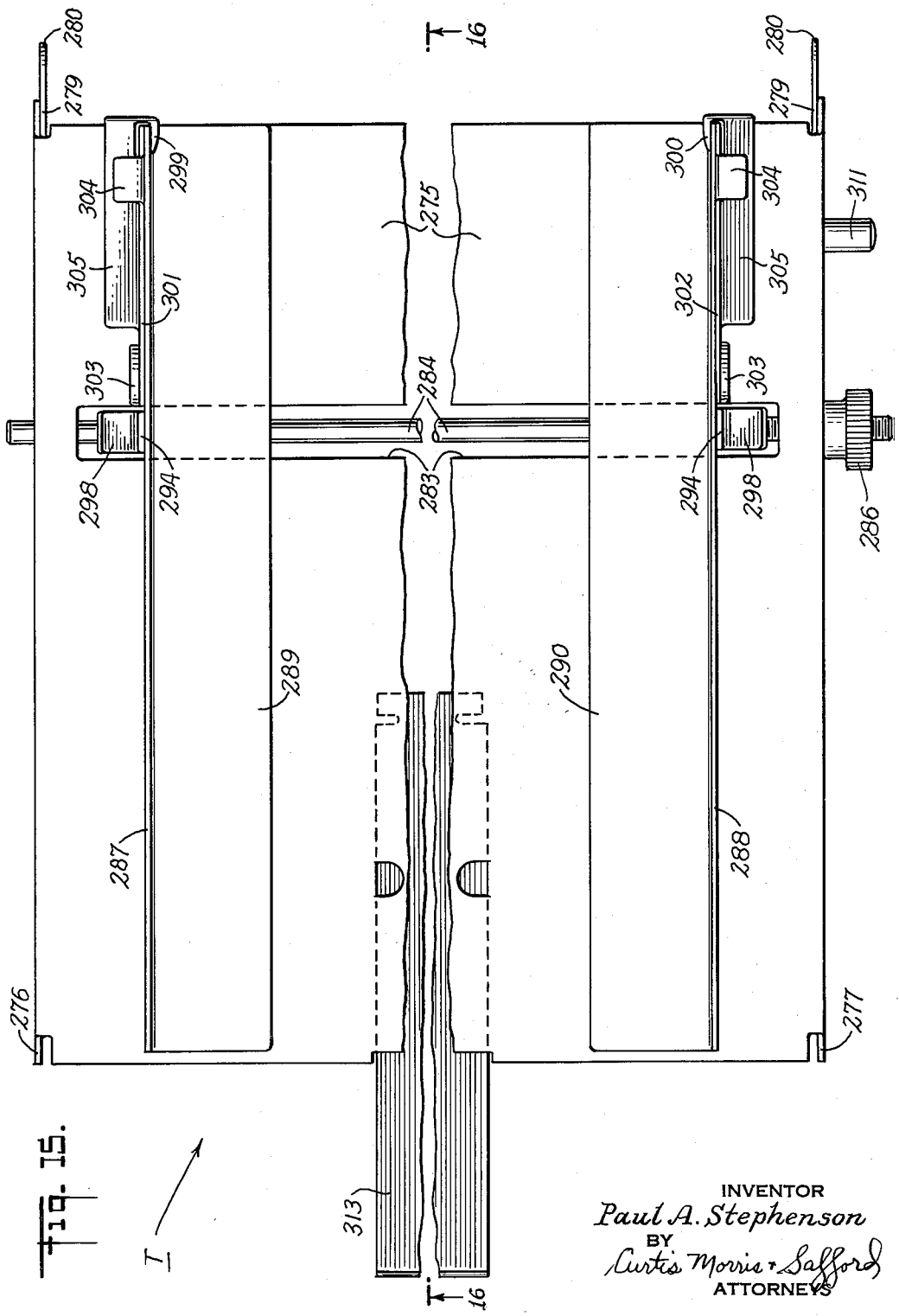

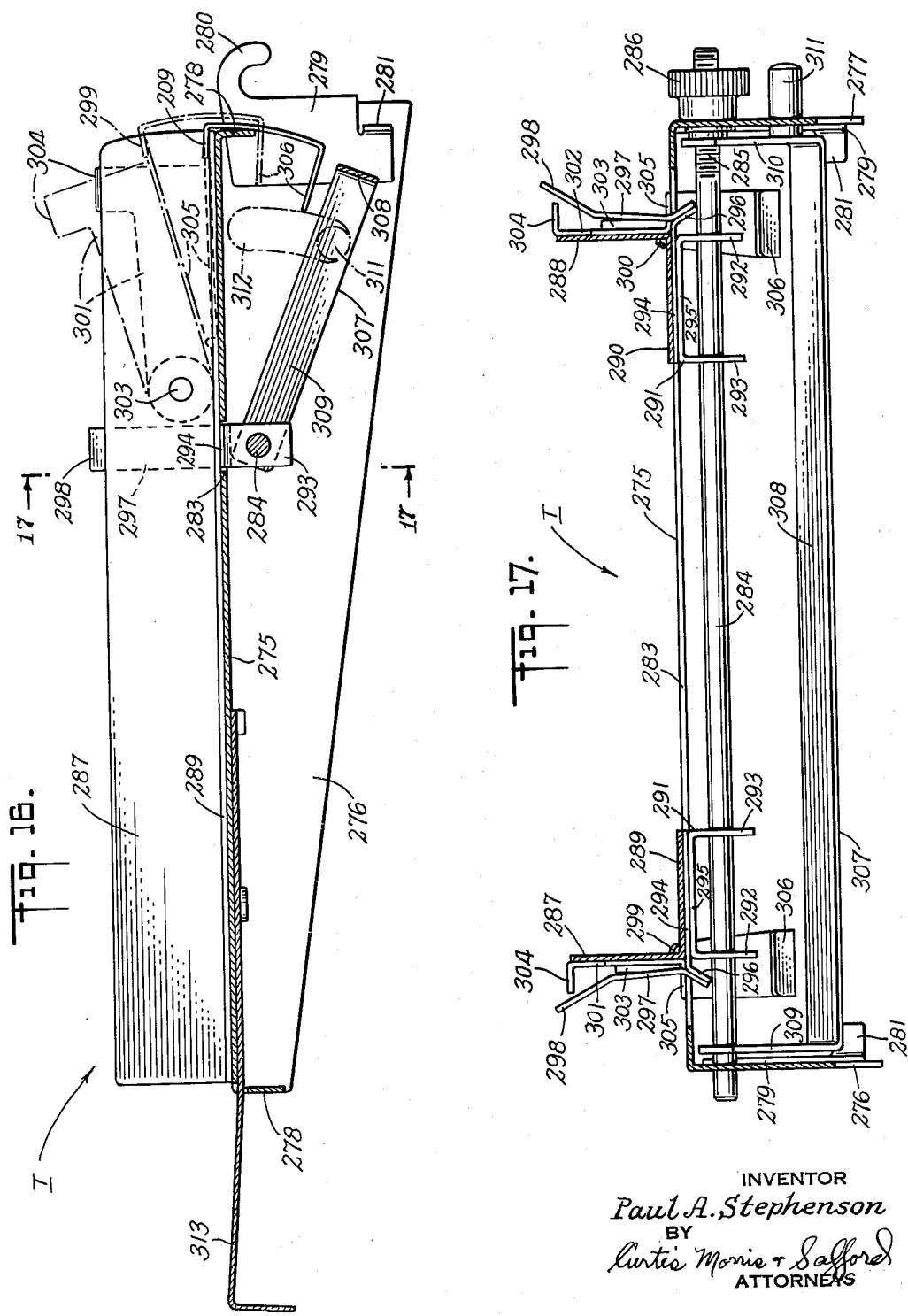

United States Patent Office 2,993,438
Patented July 25, 1961

2,993,438
DUPLICATING MACHINES
Paul A. Stephenson, Hamden, Conn., assignor to Old Town Corporation, New York, N.Y., a corporation of New York
Continuation of application Ser. No. 638,022, Feb. 4, 1957. This application June 18, 1957, Ser. No. 666,369
34 Claims. (Cl. 101—132.5)

The present invention relates to duplicating machines used to make copies of writings from a master sheet. This application is a continuation of my prior application Serial No. 638,022 filed February 4, 1957, now abandoned.

Heretofore, many different types of duplicating machines have been used in which the writing to be reproduced is applied to a master sheet. The master sheet is mounted on the periphery of a rotatable drum and copy sheets fed between it and an impression roller. One commonly used type of duplicating machine has the writing to be reproduced formed in a stencil constituting the master sheet. Ink from a pad on the drum flows through the stencil and onto the copy sheets. In another type of duplicating machine the writing is applied to the surface of the master sheet with a special type of carbon. The copy sheets are then moistened with a liquid which acts as a solvent for the carbon on the master sheet to transfer part of the carbon onto each of the copy sheets.

Such prior machines are of complicated construction and expensive to manufacture. They include a number of manually operable control handles for adjusting the various elements of the machine. Such multiple control handles are confusing to the operator unless he is extremely familiar with the machine and render the initial set-up and adjustment of the machine difficult even for a skilled operator. Proper line registry of the copy sheets with the master sheet is difficult to obtain and the multiple control elements can only be conveniently actuated by a right-handed person located at one end of the machine. The same deficiencies apply to shifting from idle to running conditions.

Furthermore, the controls on prior machines are not arranged to facilitate natural manipulation, even by right-handed persons, to synchronize the feeding of copy sheets with the master sheet after the latter has been attached to the drum. The handle for releasing the master sheet clamp is usually operated by the left hand while the master sheet is being applied to the drum. The copy sheet feeding control, however, is located at the left of the handle. The natural tendency of an operator of the machine, especially a novice, is to move the handle to the left before actuating the copy sheet feeding control with the right hand. Such movement of the handle before engaging the copy sheet feeding mechanism is apt to cause misalignment of the master and copy sheets.

Prior machines incorporating a moistening roller for wetting one side of the copy sheets with a solvent liquid do not incorporate adequate controls to insure relaxing of the wick during set-up and idle periods of the machine. Thus, during idle periods of the machine, the wick is many times left engaged with the moistening roller at considerable pressure. This deforms the wick and interferes with the proper feeding of liquid solvent during the next period of operation of the machine.

It will be apparent from the above discussion that the prior machines are not fool proof in set-up and operation and, unless the operator of the machine is thoroughly trained, require excessive time to run a job, produce waste and have a high cost of maintenance and replacement of parts.

One of the objects of the present invention is to provide a duplicating machine of improved construction which facilitates the initial set-up and adjustment of the parts for any particular job.

Another object is to provide a duplicating machine of the type indicated in which the relationship between the master and copy sheets may be easily and quickly adjusted to produce any line registry desired.

Another object is to provide a duplicating machine of the type indicated which may be manually controlled from either side of the machine to shift from an inoperative set-up and adjusting condition to an operative running condition.

Another object is to provide a duplicating machine of the type indicated in which the relatively soft pressure rollers may be easily and quickly disengaged to prevent their deformation during idle periods of the machine.

Another object is to provide a duplicating machine of the type indicated which may be set-up and operated by a person with a minimum of instruction and training by natural motions of the hands and which is foolproof when operated by an unskilled person.

Another object is to provide a duplicating machine of the type indicated in which the copy sheets are moistened with a solvent for the carbon on the master sheet.

Another object is to provide a duplicating machine of the type indicated which may be easily and quickly changed for operating or idle conditions and for set-up or running conditions.

Another object is to provide a duplicating machine of the type indicated in which the flow of solvent liquid is automatically controlled by a mechanism for adapting the machine for idle and operating conditions.

Another object is to provide a duplicating machine of the type indicated in which the pressure between the impression roller and master sheet can be gradually increased to compensate for the depletion of the carbon on the master sheet.

Another object is to provide a duplicating machine of the type indicated in which a single manually operated control simultaneously controls the flow of solvent to the liquid applying mechanism and engages and disengages the pressure rollers.

Another object is to provide a duplicating machine of the type indicated in which a single manually operable control simultaneously controls the feeding of copy sheets, the supply of solvent liquid to the liquid applying mechanism and adjusts the drum to receive or release the master sheet.

Another object is to provide a paper feed table for a duplicating machine of the type indicated which controls the feed of paper from either side either singly or jointly for paper of any width.

Still another object is to provide a duplicating machine of the type indicated which is of simple and compact construction, economical to manufacture and reliable in operation.

In this specification and accompanying drawings I have shown and described a preferred embodiment of my invention; but it is to be understood that the illustrated embodiment is not intended to be exhaustive or limiting of the invention. On the contrary, the drawings are for the purpose of illustration only in order that others skilled in the art may fully understand the invention and the principles thereof and the manner of applying it in practical use, so that they may modify and adapt the invention in various forms and to other types of duplicating machines each as may be suited to the conditions of a particular use. As is apparent many features of the invention may be incorporated in duplicating machines of other constructions and types than that shown in the drawings.

In the drawings—
FIGURE 1 is a perspective view of a duplicating machine incorporating the novel features of the present invention;

FIGURE 5 is a sectional view taken on line 5—5 of FIGURE 3 to show the adjustable handle for driving the machine;

FIGURE 5A is a detail view of the latch in FIGURE 5 to show the eccentric pin for micro adjustment;

FIGURE 6 is a sectional view taken on line 6—6 of FIGURE 5 to show the cam sleeve on the adjustable handle for driving the paper feed mechanism and moistening roller and the latch for adjusting the cam sleeve with respect to the drum to produce any desired line registry of the copy sheets with the master sheet on the drum;

FIGURE 7 is a sectional view taken on line 7—7 of FIGURE 3 to show the driving means operated by rotation of the handle to actuate the paper feed mechanism and moistening roller;

FIGURE 8 is a sectional view taken on line 8—8 of FIGURE 3 to show the liquid supply tray and wick therein mounted to rock toward and away from the moistening roller;

FIGURE 9 is a sectional view taken on line 9—9 of FIGURE 3 to show the wick mounted on the liquid supply tray to rock about an axis intermediate its ends for self alignment with the periphery of the moistening roller;

FIGURE 10 is a plan view of the clamping bar on the periphery of the drum and operating means therefor;

FIGURE 13 is a sectional view taken on line 13—13 of FIGURE 3 to show the reservoir vessel mounted for vertical movement relative to the supply tank and liquid supply tray to control the flow of moistening liquid to or from the tray;

FIGURE 14 is a sectional view taken on line 14—14 of FIGURE 3 to show the control valve in the supply tank and its relation to the reservoir vessel;

FIGURE 15 is a plan view of the paper feed table showing the control fingers for regulating the feeding of the top sheet of a stack mounted thereon;

FIGURE 16 is a longitudinal sectional view taken on line 16—16 of FIGURE 15 to show the mechanism for limiting the control fingers; and FIGURE 17 is a transverse sectional view taken on line 17—17 of FIGURE 16 to show the means for adjusting the side plates and control fingers laterally for paper of different width and for margin control.

Machine in general

Figure 1:
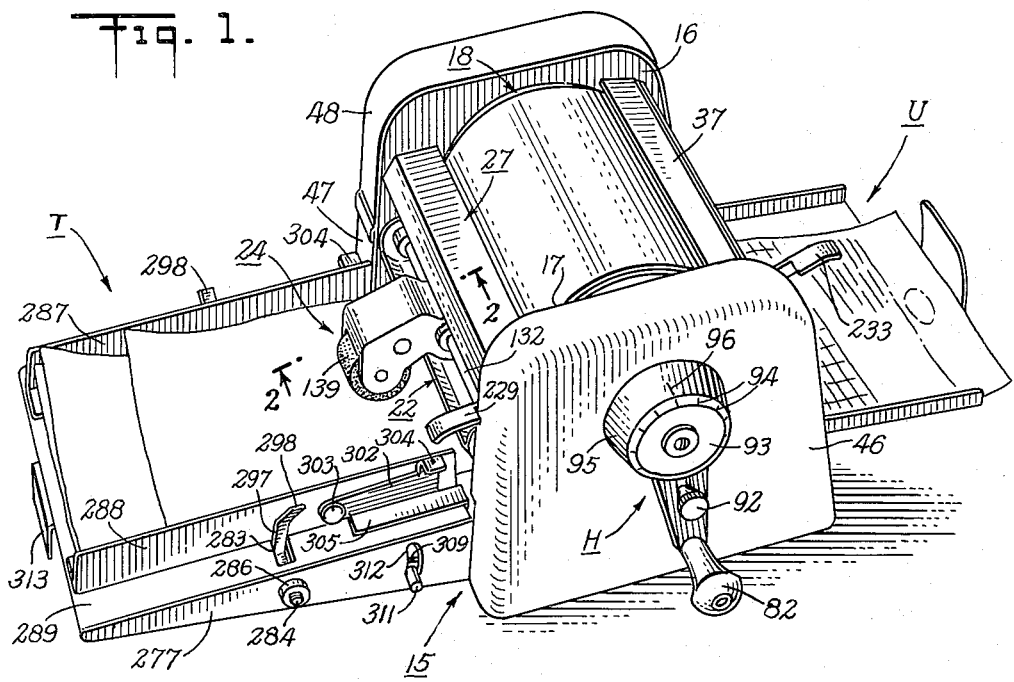

The duplicating machine is shown in FIGURE 1 as comprising a frame 15 having spaced side plates 16 and 17 for supporting the various operating elements. A feed table T is attached to and projects forwardly from the front of the machine to support a stack of copy sheets to be printed and a receiving tray U projects from the rear of the machine to receive the printed copy sheets. A handle H is provided at one side for operating the machine.

Referring to FIGURES 1 to 4, the operating elements comprise a rotating drum 18 to which a master sheet may be attached so as to lie on its periphery. An impression roller 19 is so mounted adjacent the drum 18 as to press copy sheets between it and the master sheet on the periphery of the drum. A moistening roller 20 is positioned at the front of the drum 18 and impression roller 19 and over which the successive copy sheets are advanced to wet the surface of the sheets contacting the master sheet. A pressure roller 21 cooperates with the moistening roller 20 to press the copy sheets into contact with the moistening roller. Forwardly of the moistening roller 20 is a liquid supply tray 22 which mounts a wick 23 for contacting the surface of the moistening roller to supply solvent liquid thereto. A paper feeding mechanism 24 is provided for advancing successive copy sheets between the moistening roller 20 and pressure applying roller 21 and into the bight between the drum 18 and impression roller 19 in predetermined timed relation with the rotation of the drum.

Figure 3:
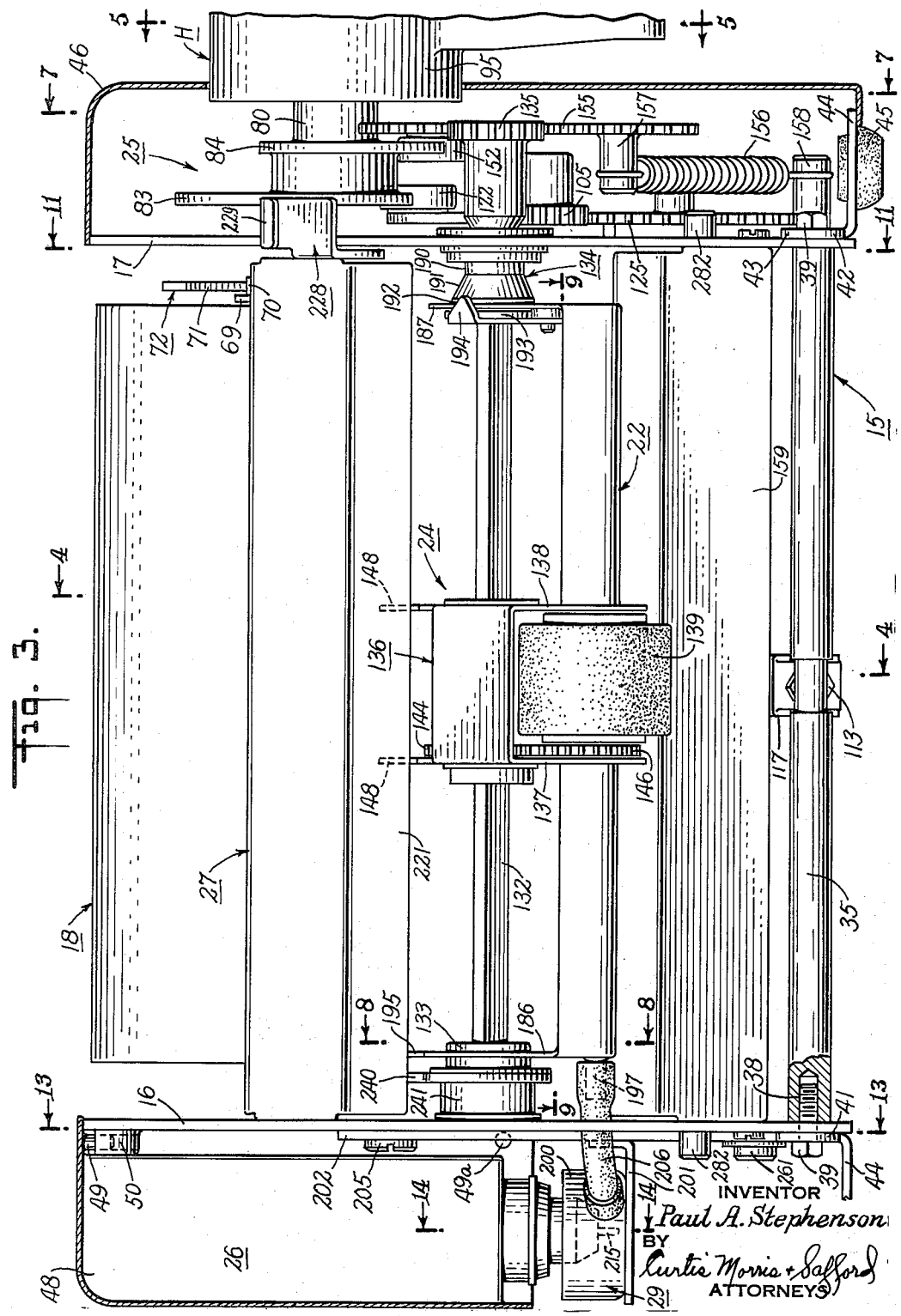
FIGURE 3 is a front elevational view of the duplicating machine with the paper supporting table removed.

The moistening roller 20 and paper feeding mechanism 24 are operated in timed relation to the rotation of drum 18 by driving means 25 at one end of the machine and operated by the handle H. The driving means 25 include a driving element adapted to be latched to or unlatched from the drum 18 to adjust the position of the latter relative to the fixed driving element to produce any desired line registry of the copy sheets with the master sheet. Liquid feeding means 26, see FIGURE 3, is provided at the opposite end of the machine from the driving means for supplying solvent liquid to the liquid supply tray 22, wick 23 and moistening roller 20.

The machine also incorporates a manually operable control 27 to adjust the machine for set-up or running conditions. For this purpose, the control bar 27 is movable to one position to simultaneously actuate the paper and liquid feeding mechanism 24 and 26 to inoperative positions and actuate a stopping lever into position to release the clamping mechanism for the master sheet. In another position the control bar 27 moves the parts to their operative running positions.

Another manually operable control 28 is provided to adjust the machine for running and idle conditions. Control 28 raises and lowers a reservoir vessel 29 of the liquid feeding means 26 to control the flow of solvent liquid to and from the liquid supply tray 22 and wick 23. The manually operable control 28 simultaneously moves the impression roller 19 and pressure roller 21 into and out of engagement with the drum 18 and moistening roller 20, respectively, during the raising and lowering of the reservoir vessel 29 to prevent deformation of the relatively soft rollers during idle periods of the machine. The same manually operable control 28 also is operable to gradually increase the pressure on the copy sheet against the master sheet by the impression roller 19 to compensate for gradual depletion of the carbon on the master sheet. The arrangement is such that the pressure applied by the impression roller 19 can be varied independently of the pressure applied by the pressure roller 21 against the moistening roller 20.

Frame and cylinder

Figure 4:
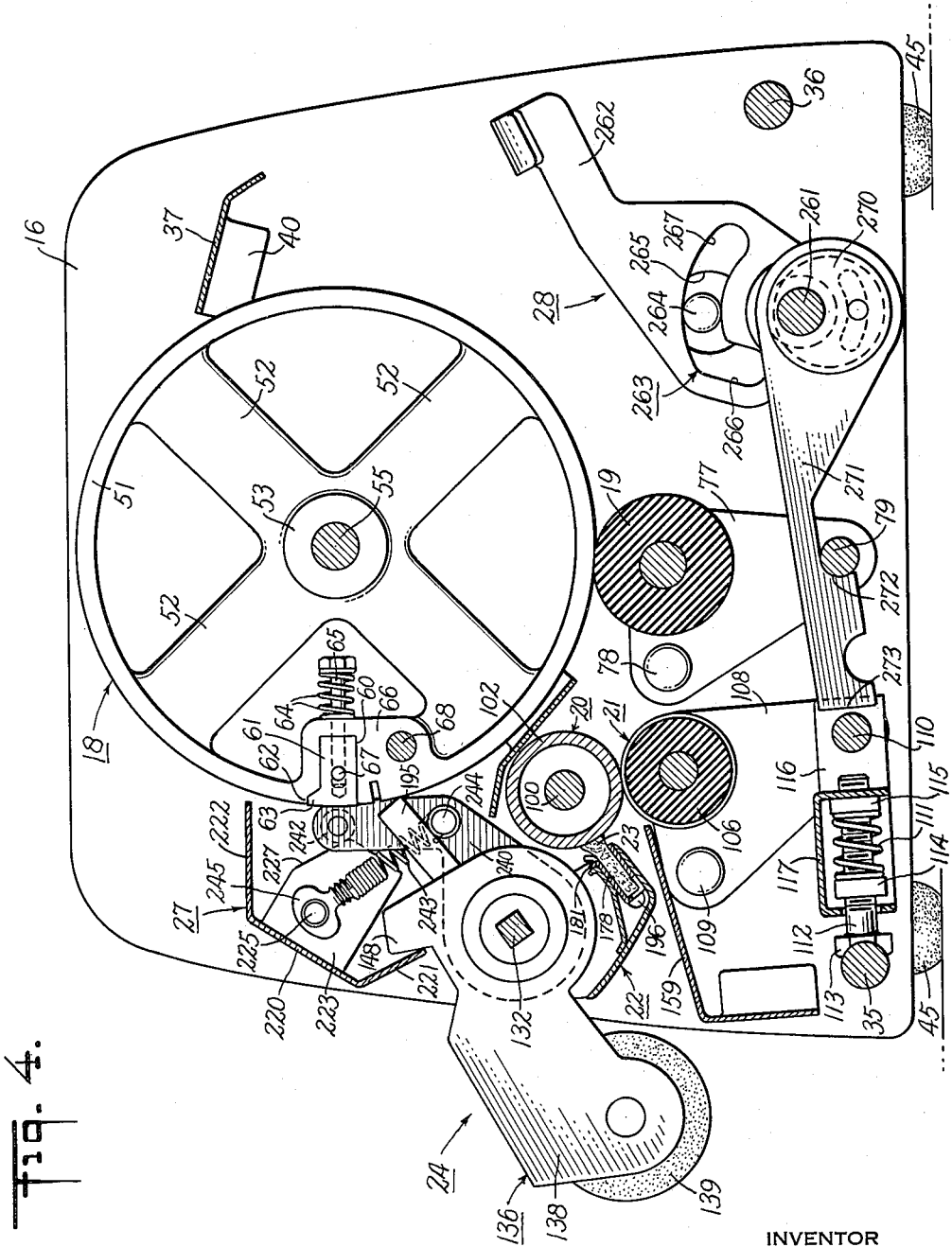
FIGURE 4 is a transverse sectional view taken on line 4—4 of FIGURE 3 to show the relationship of the various parts of the machine.

The side plates 16 and 17 of frame 15 are of generally rectangular shape with front and back edges tapering slightly from the base towards the top, see FIGURES 1 and 4. The side plates 16 and 17 of the frame 15 are constructed of relatively thin sheet metal, such as aluminum or the like, and are held in spaced relation to each other by spaced tie rods 35 and 36 adjacent the base thereof at the front and rear and a cross strut 37 adjacent the top and rear of the plates, see FIGURE 4.

In the illustrated embodiment, the ends of the tie rods 35 and 36 abut the inside faces of the side plates 16 and 17 and have tapped holes in their ends to receive screws 38 with the heads 39 of the screws engaging the opposite sides of the plates. The cross strut 37 is in the form of a sheet metal plate with flanges 40 at its ends overlying the inside faces of the side plates 16 and 17 and attached thereto by screws extending through the side plates and screwed into retaining plates at the opposite side. Thus, the tie rods 35 and 36 and cross strut 37 rigidly hold the side plates 16 and 17 in their proper spaced relationship to form the frame 15.

As shown in FIGURE 3, angle brackets 41 and 42 are attached to the base of each side plate 16 and 17. The brackets 41 and 42 have a vertical flange 43 attached to the outer faces of the side plates 16 and 17, respectively, as by screws, and a horizontal flange 44 projecting outwardly from the side plates. Rubber feet 45 are mounted ond and depend from the horizontal flanges 44 to support the machine on a table or other supporting surface. A removable machine cover 46 is detachably connected to the side plate 17 at the right-hand side of the machine, as viewed in FIGURE 3, to provide a closure for the driving mechanism 25, later described in detail. A similar closure cover 47 is provided at the lefthand side of the machine as viewed in FIGURE 1 which extends upwardly for less than half the height of side plate 16. Overlying the closure cover 47 is a liquid supply tank 48 which is supported on the top edge of side plate 16 and retained in position thereon by a pin 49 engaging recessed bracket 50 on the side plate, see FIGURE 3. Similar pins 49a at each side of tank 48 engage the plate 16. The lower closure cover 47 and liquid supply tank 48 form a continuous surface corresponding in shape and contour to the removable cover 46 at the right-hand side of the machine.

The drum 18 is in the form of a metal casting, see FIGURE 4, having a hollow cylindrical shell 51 with spaced radial arms 52 at each end terminating in axial bearing hubs 53. Drum 18 is positioned between the spaced side plates 16 and 17 of the frame 15, see FIGURE 3, and is mounted fast on a shaft 55, see FIGURE 4, extending through the hubs 53 and journaled in bearings 56 in the side plates, see FIGURE 6. Bearings 56 are of the antifriction type, such as ball or roller bearings, projecting through holes 57 in the side plates 16 and 17 and attached thereto. As shown in FIGURES 5 and 6, one end 55a of the shaft 55 extends beyond the side plate 17 of the frame 15 and mounts a hub 58 at its end. Hub 58 has a plurality of teeth 59 in its outer periphery corresponding with the spacing between lines on the master sheet.

Figure 12:
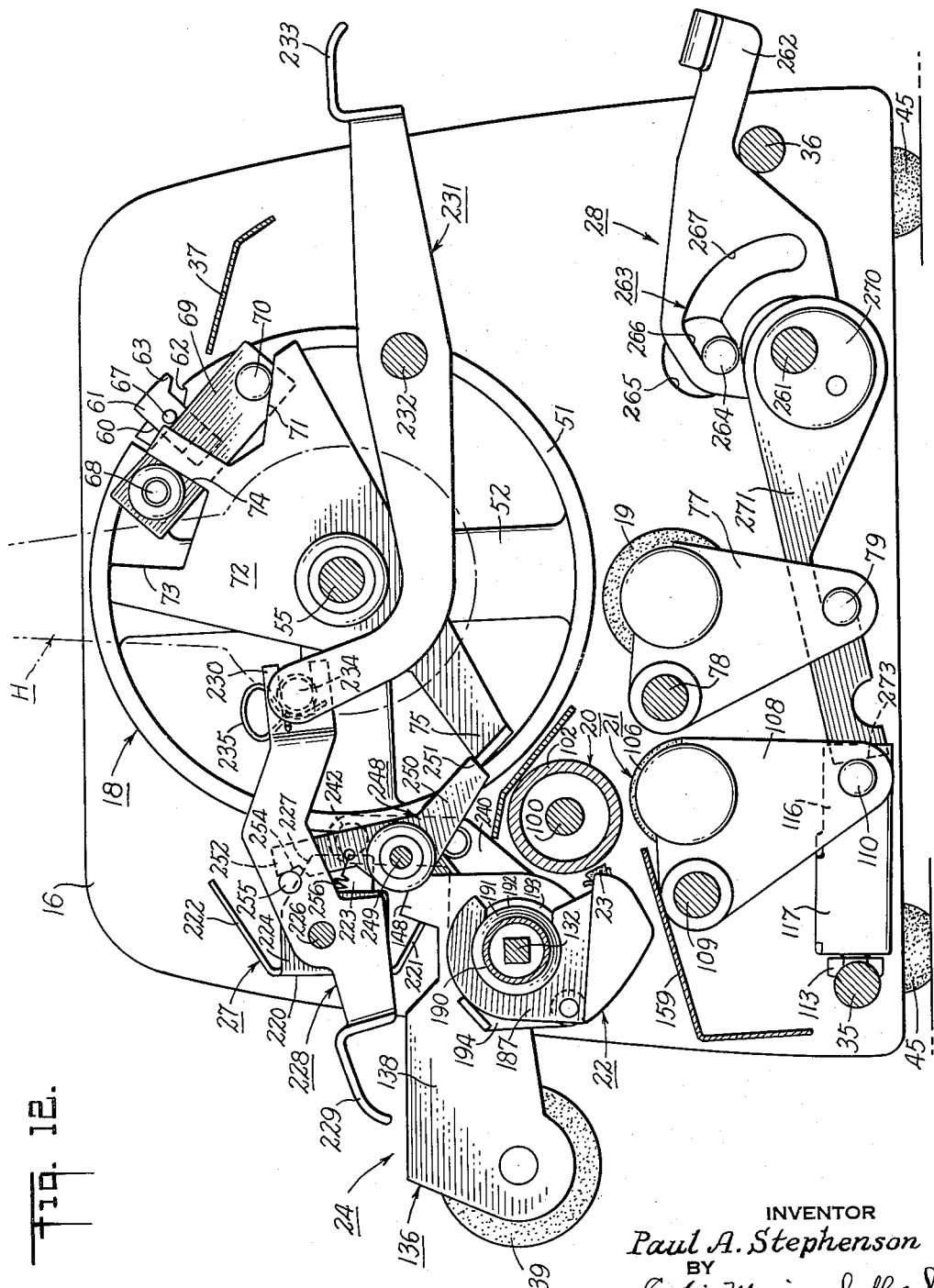
FIGURE 12 is a transverse sectional view similar to FIGURE 11 and showing the manually operable controls moved to idling position to illustrate the relationship of the elements when the machine is idle.

As shown in FIGURES 4, 10 and 12, the shell 51 of drum 18 has a longitudinally extending radial slot 60 therein with a clamping bar 61 mounted in the slot. One side of the radial slot 60 is set off angularly and then upwardly to provide a vertical shoulder 62 and the side of the clamping bar is similarly offset to provide a cooperating vertical clamping shoulder 63. As shown in FIGURE 4, the clamping bar 61 is yieldingly held in seated position in the slot 60 by a spring 64 acting between the head of a radial stud 65 projecting inwardly from the bar and a depending boss 66 on the drum. When the clamping bar 61 is seated in the slot 60 its outer surface forms a continuation of the surface of the drum 18 and its vertical shoulder 63 is adapted to clamp one end of a master sheet against the shoulder 62 at the side of the slot. When the clamping bar 61 is moved radially against the action of the spring 64 to releasing position it releases a master sheet previously attached thereto, or permits the end of a master sheet to be inserted to clamping position.

The clamping bar 61 is moved radially outwardly against the action of the spring 64 by means of pins 67 projecting from its ends and beyond the ends of the drum 18, see FIGURE 10. A rock shaft 68 extends longitudinally of the drum 18 adjacent the clamping bar 61 and has arms 69 at each end underlying the projecting pins 67, see FIGURES 10 and 12. The arm 69 at one end of the drum 18 has an outwardly projecting follower pin 70 engaged by a cam 71.

Figure 11:
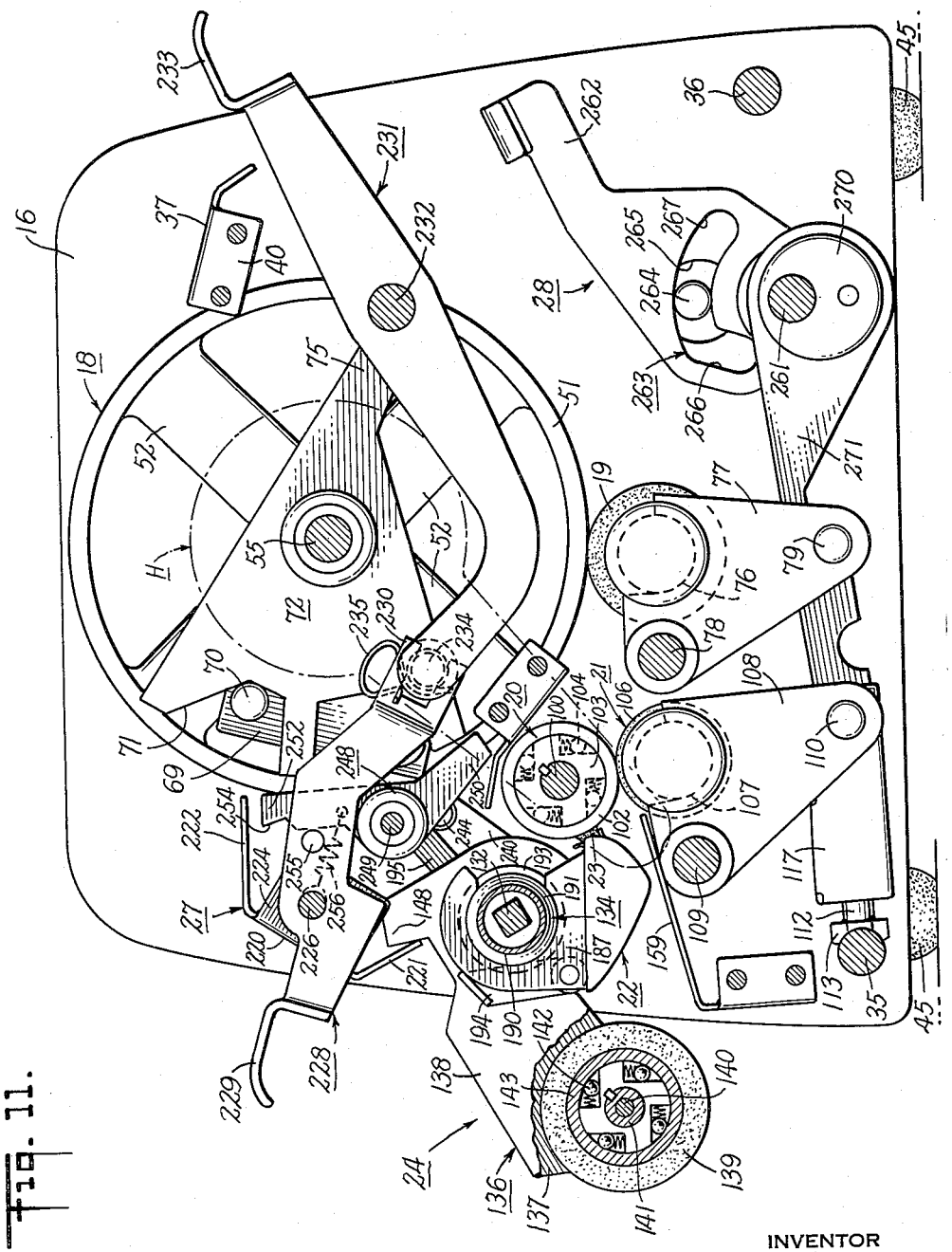
FIGURE 11 is a transverse sectional view taken on line 11—11 of FIGURE 3 to show the manually operable controls moved to operating position and illustrating the relationship of the elements when the machine is operating.

By reference to FIGURE 11 and 12, it will be noted that the cam 71 is formed at the end of a lever 72 mounted to rock freely on the shaft 55 between the end of the cylinder 18 and side plate 17. The end of the lever 72 has a plurality of spaced recesses in its outer edge into which the projecting ends of the follower pin 70 and rock shaft 68 extend. Cam 71 is formed on the edge of one of the recesses. The other recess provides spaced radial shoulders 73 and 74 to limit the rocking movement of the lever relative to the drum. The end of the cam lever 72 opposite the cam 71 projects in a generally radial direction and constitutes an actuating arm 75 for engagement with a stop lever, as later explained in detail.

The impression roller 19 is composed of a relatively soft material, such as rubber, and presses the copy sheets against the master sheet on the drum 18 with a pressure which may be varied in accordance with requirements. As shown in FIGURES 4, 11 and 12, the impression roller 19 is rotatably mounted in bearing recesses 76 in the upper edge of opposed plates 77. Plates 77 are pivotally mounted on pins 78 projecting inwardly from the side plates 16 and 17 of the frame 15.

The lower end of the opposed plates 77 are connected to each other by a tie rod 79 to provide a cradle for rocking the impression roller 19 toward and away from the periphery of drum 18 and for varying the pressure between the copy and master sheets.

The drum 18 and lever 72 are driven from a driving element 80, see FIGURES 3, 6 and 7, in the form of a sleeve mounted to rotate on an extension 55a of the shaft 55 projecting outwardly from the side plate 17 at one end of the frame. Sleeve 80 may be driven by an electric motor or other suitable prime mover but in the illustrated embodiment the sleeve is driven manually by the handle H depending from the sleeve as shown most clearly in FIGURES 5 and 6. Handle H is in the form of a radial arm 81 projecting from the outer end of sleeve 80 and having a hand grip 82 projecting horizontally from its outer end. Cams 83 and 84 are provided on the periphery of the sleeve 80 for driving the moistening roller 20 and paper feed mechanism 24.

As shown in FIGURES 5 and 6, the sleeve 80 and handle arm 81 are connected to the extension 55a of drum shaft 55 by means of a latch 85. Latch 85 is in the form of a plate mounted to slide on the radial arm 81 of the handle H. A pin 86 closely fits a hole in latch plate 85 and extends through and is slideable in an elongated slot 87 in the handle arm. A similar pin 88 on the handle arm 81 projects through a slot 85a in the latch plate. The upper end of the latch plate 85 is aligned with the hub 58 at the end of the shaft 55a and has teeth 89 projecting therefrom. A spring 90 is connected between the extended end of one of the pins 86 and a lug 81a on the arm 81, see FIGURE 6, to engage the teeth 89 at its end with the teeth 59 on the hub 58 and thereby lock the handle to the drum shaft 55 for rotation as a unit.

Pin 86 also projects forwardly from the latch plate 85 to provide a finger grip 92 for retracting the latch plate 85 against the action of the spring 90. Handle arm 81 then may be rotated to any angular position with respect to the shaft 55 and drum 18 mounted thereon. As the cams 83 and 84 on the sleeve 80 actuate the moistening roller 20 and paper feeding mechanism 24, respectively, such adjustment of the sleeve 80 relative to the shaft 55 adjusts the line registry of the copy sheets with respect to the master sheet on the periphery of the cylinder. As shown in FIGURE 5A, pin 86 also constitutes a micro adjusting means for splitting lines when required. Pin 86 has an axial hub 97 in slot 87 and an eccentric hub 98 in the hole in latch plate 85 so that by turning pin 86 the latch plate is rocked slightly relative to the handle arm 81 to turn shaft 55 through gear teeth 89 and 59 relative to sleeve 80. The throw of the eccentric hub 98 is just sufficient to produce any desired adjustment between the spacing of one line by turning pin 86.

To facilitate adjustment of the line registry on the master and copy sheets a dial 93 is provided at the end of shaft 55, see FIGURES 1 and 6, and has radial numbered lines 94 corresponding to the lines on the master sheet and the handle H has a covering shell 95 adjacent the dial with an index mark 96.

Moistening roller and drive

The moistening roller 20, as shown most clearly in FIGURES 3, 4, 7, 11 and 12, is positioned in front of the drum 18 and impression roller 19, see FIGURE 4, and extends between the side plates 16 and 17 of the frame 15 in which it is rotatably mounted. Referring to FIGURES 7 and 11, the moistening roller 20 comprises a shaft 100 journaled in suitable bearings in the side plates 16 and 17 of the frame. The outer periphery of the moistening roller 20 comprises a hollow cylindrical shell 102, see FIGURE 11, composed of a non-corrosive material. The cylindrical shell 102 is supported on the shaft 100, by ball bearings, not shown. Notched discs 103 of a one way clutch are keyed to the shaft 100 for rotation therewith and rollers 104 are provided in the notches of the discs to grip or release the shell. Rollers 104 are adapted to grip the hollow cylindrical shell 102 for rotation with the shaft during rotation counterclockwise as viewed in FIGURE 11 and release the shell upon clockwise rotation of the shaft. As shown in FIGURES 3 and 7, one end of the shaft 100 projects beyond the side plate 17 and has a spur gear 105 mounted fast thereon.

The pressure roller 21 for maintaining the copy sheets in contact with the moistening roller 20 also is composed of a relatively soft material such as rubber and has a series of spaced ribs 106 on its periphery. Pressure roller 21 also is mounted at its ends in bearing slots 107 in the upper edge of spaced plates 108 pivotally mounted on pins 109 projecting inwardly from the side plates 16 and 17 of the frame 15, see FIGURE 11. The lower free ends of the spaced plates 108 are connected to each other by a tie rod 110 to provide a cradle for rocking the pressure roller 21 toward and away from the periphery of the moistening roller 20. A spring 111, see FIGURE 4, acting between the frame tie rod 35 and cradle tie rod 110 engages pressure roller 21 with the moistening roller 20 with a predetermined fixed pressure. Spring 111 surrounds the shank of a bolt 112 having a recessed head 113 conforming to the contour of the periphery of the tie rod 35 which acts as a fixed abutment. One end of the spring 111 bears against an adjusting nut 114 on the threaded shank of the bolt 112 and the opposite end of the spring 111 bears against an abutment 115 on a push rod 116. The end of the push rod 116 is connected to the tie rod 110 of the roller cradle. Abutment 115 constitutes one wall of a housing 117 projecting from one side of the push rod 116 and through which the threaded shank of bolt 112 extends. The fixed pressure at which the roller 21 engages the moistening roller 20 may be adjusted by turning the nut 114 on the threaded shank of the bolt 112 to compress the spring 111 between it and abutment 115.

As shown in FIGURE 7, the moistening roller 20 is intermittently rotated in timed relation with the drum 18 by driving mechanism operated by the cam 83 on the driving sleeve 80. The driving mechanism comprises a lever 120 pivotally mounted intermediate its end on a pivot pin 121 projecting from the outer face of the frame side plate 17. A follower roller 122 is provided at one end of the lever 120 in alignment with the cam 83. The opposite end of the lever 120 is of arcuate form and has teeth 124 at its edge to provide a segment gear 125 intermeshing with the spur gear 105 on the end of the moistening roller shaft 100. A spring 126 is connected between lugs 127 and 128 on the lever 120 and side plate 17 to rock the lever counterclockwise as viewed in FIGURE 7 to hold the follower roller 122 in engagement with the periphery of the cam 83.

Thus, when sleeve 80 is rotated by the handle 81, see FIGURES 3 and 7, cam 83 rocks lever 120 and acting through the segment gear 125 and spur gear 105 rotates shaft 100 counterclockwise. Such counterclockwise movement of the shaft 100 engages the clutch rollers 104 between the notched discs 103 and hollow cylindrical shell 102 to rotate the latter with the shaft, see FIGURE 11. As the cam 83 dwells the spring 126 rocks lever 120 counterclockwise to rotate the shaft 100 clockwise and the rollers 104 disengage the hollow cylindrical shell to return the shaft to its initial position without rotating the periphery of the moistening roller. Thus, the notched discs 103 and rollers 104, see FIGURE 11, constitute a one way clutch in the driving mechanism to drive the moistening roller in the direction of feed of the copy sheets but without rotation of the moistening roller during the return movement of the shaft 100.

Paper feed mechanism and drive

Paper feed mechanism 24, shown in FIGURES 1 to 4, 7, 11 and 12 advances successive copy sheets over the moistening roller 20 and into the bight between the drum 18 and impression roller 19 in timed relation to the rotation of the drum.

Referring to FIGURES 1 to 4, the paper feed mechanism 24 comprises a square shaft 132 extending between the side plates 16 and 17 of the frame 15 and having its ends journaled in bearing hubs 133 and 134 in the side plates. One end of the shaft 132 projects beyond the frame side plate 17 and mounts a spur gear 135. Also mounted on the square shaft 132 between frame side plates 16 and 17 is a forwardly projecting arm 136. Arm 136 comprises a sheet metal plate folded to a rectangular channel shape having spaced side plates 137 and 138 and an open bottom, see FIGURE 3. The side plates 137 and 138 have aligned circular holes adjacent their rearward ends through which the square shaft 132 extends. The holes are of a diameter substantially equal to the periphery of a cylindrical hub mounted to slide on the square shaft 132 to adapt the arm to freely rock on the shaft and to slide longitudinally thereof from one end of the shaft to the other between the side plates 16 and 17. An actuating lug 148 projects upwardly and rearwardly from each side plate 137 and 138 for rocking the forwardly projecting arm 136 clockwise as viewed in FIGURE 4.

A paper feeding friction roller 139 is positioned between the forward ends of the side plates 137 and 138 of the forwardly projecting arm 136 and is mounted to rotate therein on a shaft 140 extending between the plates. Friction roller 139, see FIGURE 11, is of a construction similar to the moistening roller 20 comprising an inner sleeve 141 mounted on shaft 140, an outer cylindrical shell 143 mounted to rotate on ball bearings between it and the sleeve and a one way clutch 142 between the sleeve and shell. One way clutch 142 drives the hollow cylindrical shell 143 counterclockwise and releases the shell when the sleeve is driven clockwise.

Figure 2:
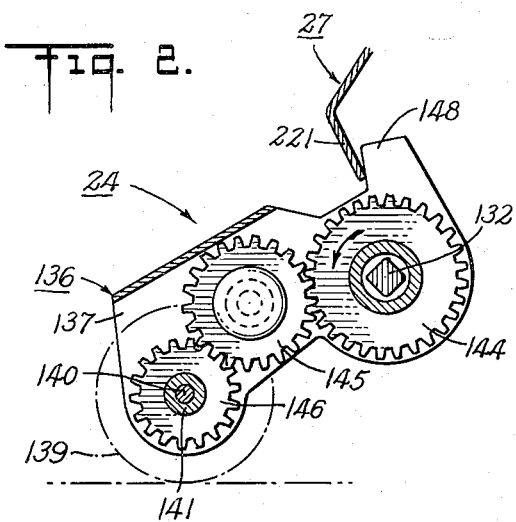
FIGURE 2 is a sectional view taken on line 2—2 of FIGURE 1 to show the gearing for operating the friction roller of the paper feeding mechanism.

Friction roller 139 is driven from the square shaft 132, see FIGURE 2, by a train of spur gears 144, 145 and 146. Gear 144 has a square axial hole through which the square shaft 132 extends to adapt it to slide longitudinally thereon while locking it to the shaft for rotation therewith. Spur gear 146 is keyed to the sleeve 141. Spur gear 145 constitutes an idler for rotating the friction roller 139 in the same direction as the square shaft 132. It will be noted by reference to FIGURE 2 that counterclockwise rotation of square shaft 132 tends to rock arm 136 counterclockwise as viewed in FIGURE 2 until the top sheet of the stack of sheets slips to supply the gripping pressure required on the sheet. The copy sheets S are stacked on a feed table T, later to be described in detail.

Referring now to FIGURES 3 and 7, the square shaft 132 and friction roller 139 of the paper feeding mechanism 24 are rotated in timed relation to the rotation of drum 18 by the cam 84 on the driving sleeve 80. The driving means comprises a lever 150 pivotally mounted intermediate its ends on a pivot pin 151 projecting from the outer face of the side plate 17. The lever 150 has a follower roller 152 rotatably mounted at one end. The opposite end of lever 150 is of arcuate contour with teeth 154 projecting therefrom and constitutes a segment gear 155 meshing with the spur gear 135 at the projecting end of the square shaft 132. A spring 156 is connected between lugs 157 and 158 on the lever 150 and side plate 17 for rocking the lever counterclockwise as viewed in FIGURE 7 to engage the cam follower 152 with the cam 84 on the driving sleeve 80. Rotation of the driving sleeve 80 and cam 84 counterclockwise rocks lever 150 to rotate square shaft 132 and friction roller 139 counterclockwise. Such rotation of the friction roller 139 advances the top sheet S of the stack of copy sheets on the platform T into the bight between the moistening roller 20 and cooperating pressure roller 21 in timed relation with the rotation of the drum 18.

As will be observed by reference to FIGURES 1 and 11, a guide plate 159 is provided for directing the copy sheets into the bight between the moistening roll 20 and its cooperating pressure roller 21. As previously explained with respect to the driving means for the moistening roller 20, the sleeve 80 and cams 83 and 84 thereon may be adjusted angularly with respect to the drum 18 by the latch 85. Such adjustment adapts the paper feed mechanism to be operated in any timed relation with respect to the drum 18 to produce the line registry desired between the master and copy sheets.

*Liquid feed mechanism*

The moistening roller 20 is wetted with liquid solvent for the carbon forming the characters written on the master sheet by the liquid feed mechanism 26. The liquid feed mechanism 26 is shown in FIGURES 3, 4, 8, 9, 11, 12 and 13 as comprising the wick 23 contacting the moistening roller 20, the liquid supply tray 22 in which the wick is mounted, the reservoir vessel 29 for feeding liquid to the liquid supply tray and supply tank 48 for delivering liquid to the reservoir vessel.

Referring to FIGURES 8 and 9, the wick 23 extends throughout the length of the moistening roller 20 and is supported in a U-shaped sheet metal wick holder 178 having a series of perforations 179. The wick 23 and wick holder 178 are mounted in an upwardly inclined trough 180 in the liquid supply tray 22. As shown in FIGURE 9, the sheet metal wick holder 178 has lugs 181 projecting laterally from the upper edges thereof intermediate its ends which contact the upper edges of the trough 180 in the liquid supply tray to adapt the wick holder to automatically rock the projecting edge of the wick 23 into self-alignment with the periphery of the moistening roller. Thus, the wick 23 is supported in the liquid supply tray 22 with one end projecting therefrom for contacting the moistening roller 20 throughout its length.

Liquid supply tray 22 is in the form of a cradle and mounted to rock the wick 23 toward and away from the moistening roller 20. The liquid supply tray 22 comprises a bottom wall 182 with an inwardly inclined flat portion 183 forming one side of the trough 180 and an outwardly and upwardly curved front portion 184. A transverse wall 185 projects rearwardly from the front portion 184 to overlie the flat portion 183 to form the other side of the trough 180 and provide a well at the bottom of the tray. The opposite ends of the bottom and transverse walls 182 and 185 of the tray 22 are closed by end plates 186 and 187 which, in the illustrated embodiment, are upwardly drawn portions of the bottom and transverse walls. The end plates 186 and 187 have aligned circular openings 188 therein with a slot 189 of less width than the diameter of the circular opening extending rearwardly therefrom to the edge of the plate.

Referring to FIGURE 3, the liquid supply tray 22 is detachably mounted on the inwardly projecting bearing hubs 133 and 134 for the square shaft 132 of the paper feed mechanism. As will be observed at the right hand side of the machine as viewed in FIGURE 3, the bearing hub 134 has a reduced neck 190 with an outwardly tapered conical section 191 adjacent the neck and a cylindrical section 192. Inwardly on the cylindrical section 192 is a radial flange 193. Liquid supply tray 22 is mounted on the bearing hubs 133 and 134 by aligning the slots 189 in the end plates 186 and 187 with the reduced neck portion 190 of bearing hub 134 and the square shaft 132, respectively, and then bodily moving the tray rearwardly into alignment with the bearing hubs. The tray 22 is then bodily moved longitudinally so that the circular openings 188 in the end plates 186 and 187 ride onto the cylindrical portions of the bearing hubs 134 and 135 which they closely fit. A latch 194 pivotally mounted on the end plate 187 is rocked relative thereto to overlie the inner face of flange 193 and hold the tray against longitudinal movement.

The hung cradle constituting the liquid supply tray 22 normally rocks by gravity to the position illustrated in FIGURE 12 to disengage the end of the wick 23 from the moistening roller 20, but is adapted to be rocked on the bearing hubs 133 and 134 to the position illustrated in FIGURE 11 to engage the end of the wick with the roller. For this purpose, the end plate 186 has a radially extending arm 195, see FIGURES 3 and 8 for engagement by a control mechanism later to be described. As shown in FIGURES 3 and 9, the end plate 186 also is provided with an inlet opening 196 for the solvent liquid with a nipple 197 projecting therefrom.

Referring to FIGURES 3 and 13, the reservoir vessel 29 supplies solvent liquid to the tray 22 at a substantially constant level. Vessel 29 is in the form of a relatively small cup 200 supported at one end of an angle iron bracket 201 which, in turn, is attached at its opposite end to a vertically sliding plate 202. Plate 202 is mounted to slide vertically on the outer face of the side plate 16 of the frame 15. For this purpose, a shoulder screw 203 extends outwardly from side plate 16 through vertical slot 204 in the plate 202 and the plate is held against the side plate by the head 205 at the outer end of the screw. The cup 200 of the reservoir vessel 29 is connected to the nipple 197 by a flexible tube 206. Thus, when the cup 200 is raised to position the liquid level L therein above the bottom of the trough 180 of the liquid supply tray 22, liquid will flow from the cup to the trough, but when the cup is lowered so that the liquid level is below the bottom of the trough, then liquid will flow from the trough to the cup. The reservoir vessel 29 is raised and lowered to operative and inoperative position by manually operable control lever 28, later described in detail.

The liquid supply tank 48, previously described as mounted on the closure structure 47 for the side plate 16 at one end of frame 15, overlies the reservoir vessel 29. Referring to FIGS. 13 and 14, the liquid supply tank 48 has a liquid feed mechanism in the form of a nipple 210 depending from its bttoom. The nipple 210 has a valve chamber 211 formed therein with an outlet port 212 at its lower end. A valve 213 in the valve chamber 211 is normally pressed into engagement with the valve seat formed in the outlet port 212 by a spring 214. A stem 215 projects from the valve 213 through the outlet port 212. Projecting stem 215 is adapted to engage the bottom of the reservoir vessel 29 when the latter is raised to lift the valve 213 and open the outlet port 212 as shown in FIGURE 14. The end of the nipple 210 is beveled at one side thereof to provide an air inlet control at one side of the outlet port 212 to prevent any capillary rise in the outlet port. Liquid flows from the supply tank 48 to the reservoir vessel 29 and rises therein until it closes the air control inlet at the level L at the top of the beveled side of the nipple and provides an air lock to prevent the further flow of liquid to the vessel. When the liquid level L falls below the air control inlet more liquid flows into the reservoir vessel to again close the air inlet. Thus, liquid is maintained at a substantially constant level in the relatively small reservoir vessel and at a corresponding level in the trough 180 of the liquid supply tray 22.

*Control mechanism*

The control mechanism for the entire machine comprises only the manually operable fluid control lever 28 for controlling the machine for idle and operating conditions and the manually operable control bar 27 for controlling the elements for initial set-up and running sequences.

The manually operable control bar 27 for controlling the machine for set-up and running sequences is shown in FIGURES 1 to 4, 11 and 12 and extends between the side plates 16 and 17 of the frame 15. The control bar 27 is illustrated in FIGURE 4 as a sheet metal plate having a flat intermediate portion 220, a forwardly depending operating flange 221 overlying the actuating lugs 148 of paper feeding arm 136, and a rearward guard flange 222 projecting toward the periphery of drum 18. Arms 223 and 224 project inwardly from the ends of the intermediate flat portion 220 adjacent the side plates 16 and 17 of frame 15. The control bar is pivotally mounted for rocking movement on pivot pins 225 and 226 projecting inwardly from the opposite side plates 16 and 17 of the frame 15 and through the arms intermediate their ends. The upper edge of the inwardly extending arm 223 is formed to provide a cam face 227, see FIGURE 4. A strap 228 is attached to the arm 224 at the other end of the control bar 27, see FIGURE 11, which projects forwardly from the bar to provide a manually operable handle 229 and rearwardly from the bar to provide an extension. The end of the rearward extension is slotted to provide a yoke 230. Thus, the control bar 27 may be manually rocked by raising or lowering either end of strap 228.

Also, as shown in FIGURE 11, a second manually operable dual control lever 231 is pivotally mounted intermediate its ends on a pivot pin 232 projecting inwardly from the side plate 17. The rearward end of dual control lever 231 is provided with a handle 233 while the forward end of the lever is provided with a laterally projecting pin 234 adapted to ride in the yoke 230 in the rearward extension of strap 228. An overcenter spring 235, see FIGURES 11 and 12, acts between the articulated ends of the lever 231 and strap 228 in either extremity to yieldingly retain them in their raised or lowered positions. Thus, the control bar 27 may be operated by the handle 229 at the front of the machine or by the handle 233 at the rear of the machine to facilitate the operation thereof by either hand. Such an arrangement of dual control levers 228 and 231 at the front and back of the machine facilitates operation of the feed control in relation to attaching the master sheet to drum 18 by natural movements of either right or left-handed persons to insure synchronization of the paper feed with rotation of the master sheet.

The forwardly depending flange 221 of the control bar 27 overlies the actuating lugs 148 projecting from the forwardly extending arm 136 of the paper feeding mechanism 24. Upon rocking movement of bar 27 from the position illustrated in FIGURE 11 to that illustrated in FIGURE 12 the arm and friction roller 139 are rocked away from the stack of copy sheets S for initial set up and adjustment. Conversely, the flange 221 of control bar 27 releases arm 136 to permit the friction roller 139 to engage the top sheet S of the stack of copy sheets when the control bar is rocked from the set-up position illustrated in FIGURE 12 to running position illustrated in FIGURE 11.

Referring to FIGURE 4, control bar 27 also is adapted to rock the liquid supply tray 22 and wick 23 carried thereby toward the periphery of the moistening roller 20 when rocked to its running position illustrated in FIGURE 11 and release the tray and wick for movement away from the moistening roller 20 when rocked to its set-up position illustrated in FIGURE 12. To this end, control bar 27 acts through a pivoted actuating arm 240, see FIGURES 3, 4 and 8. Arm 240 has a hub 241, see FIGURE 3, mounted to rock on the outer periphery of the bearing hub 133 and the arm projects rearwardly and then upwardly in an inverted dog leg to a position at the rear of the cam face 227 on the rearwardly projecting arm 223 of the control bar 27. A roller 242 at the upper end of the arm 240 rides on the cam face 227. A spring 243 is connected between a pin 244 on the arm 240 and the projecting end of the pivot pin 225 to rock the arm counterclockwise as viewed in FIGURE 4 and thereby hold the follower roller 242 in engagement with the cam face 227. As shown in FIGURE 4, the tension spring 243 may be adjusted by a screw bolt 245 attached to pin 225 and adapted to be screwed into the end of the spring. When the arm 240 is rocked forwardly by spring 243 to the running position shown in FIGURE 4, the extended end of pin 244 engages arm 195 projecting radially from the liquid supply tray 22 to rock the tray counterclockwise and engage the wick 23 with the surface of the moistening roller 20. When the control bar 27 is rocked to the inoperative set-up position illustrated in FIGURE 12, the cam face 227 rocks the actuating arm 240 against the action of the spring 243 to release arm 195 of the liquid supply tray 22. Tray 22 then rocks by gravity to the position illustrated in FIGURE 12 to take the pressure off the wick 23 from the moistening roller 20.

Control bar 27 also controls the clamping bar 61 on drum 18 to clamp or release a master sheet thereto. The element actuated by the control bar 27 to control the clamping bar 61 comprises a stop lever 248, see FIGURES 11 and 12, pivotally mounted intermediate its ends on a pivot pin 249 projecting inwardly from the side plate 17 of the frame 15. As shown in FIGURES 11 and 12, one arm 250 of stop lever 248 extends inwardly between the end of the cylinder 18 and side plate 17 and its end 251 constitutes an abutment movable into and out of the path of movement of the radially projecting actuating arm 75 of the cam lever 72. The opposite arm 252 of stop lever 248 projects upwardly at the side of the rearward extension of strap 228 and its forward or left-hand edge as viewed in FIGURE 11, constitutes a cam face in the form of a notch 254 having inclined sides. A follower pin 255 projects inwardly from the strap 228 at the side of the control bar 27 and bears against the cam face 254 at the edge of the stop lever 248. A spring 256 is connected between the arm 252 of stop lever 248 and pivot pin 226 for the control bar to hold the cam face 254 in engagement with the cam following pin 255.

When the control bar 27 is rocked to running position as illustrated in FIGURE 11, the cam following pin 255 rides on the high edge or lobe of the cam face 254 to rock the abutment end 251 of stop lever 248 away from the actuating arm 175 of the cam lever 72. However, when the control bar is rocked counterclockwise from the position shown in FIGURE 11 to that shown in FIGURE 12, the follower pin 255 rides into the notch 254 and spring 256 rocks stop lever 248 counterclockwise to position the abutment 251 at its end into the path of the actuating arm 75 of cam lever 72 which rotates with drum 18. Reverse or clockwise rotation of drum 18 relative to the cam lever 72 causes the clamping bar 61 to be actuated to releasing position. Thus, manual actuation of the control bar 27 simultaneously rocks the friction roller 139 of the paper feed mechanism 24 toward and away from the top sheet of a stack of copy sheets; rocks the liquid supply tray 22 and wick 23 carried thereby toward and away from the moistening roller 20; and rocks the abutment lever 248 into and out of position to release the clamping bar 61 for the master sheet.

The manually operable control lever 28 for adjusting the machine for idle and operating conditions is shown in FIGURES 4, 11, 12 and 13 mounted fast on a rock shaft 261. Rock shaft 261 is journaled in the side plates 16 and 17 of the frame 15 and the lever 28 is positioned at the inside face of side plate 16 with its outer end formed as a handle 262 for rocking it from the position illustrated in FIGURE 11 to that illustrated in FIGURE 12. Lever 28 has a cam slot 263 formed therein into which the end of a follower pin 264 projects. Pin 264 is attached to and projects inwardly from the side plate 202 of the liquid feed means 26, see FIGURE 13, and through an opening 265 in the side plate 16 of the frame into the cam slot 263. Cam slot 263 has a lift portion 266 at one end extending outwardly from the axis of the rock shaft 261 on which lever 28 is mounted and an arcuate portion 267 connected to the upper end of the lift portion 266. Thus, when lever 261 is rocked manually from the position illustrated in FIGURE 11 to the position illustrated in FIGURE 12, the reservoir vessel 29 is lowered from an operating position above the trough 180 of the liquid supply tray 22 to an idle position below the bottom of the trough 180 so that liquid flows from the trough to the reservoir vessel. Rocking movement of lever 260 from the position illustrated in Figure 12 to the position illustrated in FIGURE 11 causes the cam slot 263 acting through pin 264 to lift the slide plate 202 and reservoir vessel 29 from its idle to its operative position to supply liquid to the trough 180 of the liquid supply tray 22. Raising and lowering of the reservoir vessel 176 also actuates the valve 213 in the supply tank 48 to control the supply of solvent liquid to the reservoir vessel, see FIGURE 14.

An eccentric 270 is mounted on the rock shaft 261 intermediate its ends and has an eccentric strap 271 projecting forwardly therefrom. Eccentric strap has a notch 272 formed in its lower edge which is hooked onto the tie-rod 79 of the cradle mounting the impression roller 19. The end 273 of the eccentric strap 271 is slightly inclined and is adapted to engage the tie rod 110 of the cradle for the pressure roller 21. Thus, rocking movement of lever 260 and rock shaft 261 to which it is connected rotates the eccentric 270. When the lever is rocked to the position illustrated in FIGURE 11 the eccentric strap 271 is moved rearwardly or to the right, to rock the impression roller 19 toward the periphery of the cylinder 18. Such movement of the eccentric strap releases the tie rod 110 of the cradle mounting the pressure roller 21 so that the spring 111 rocks the pressure roller toward the moistening roller 20. Continued rotation of the manually operable lever 28 counterclockwise as viewed in FIGURE 11, gradually increases the pressure applied by the impression roller 19 against the periphery of the drum 18.

When lever 28 is manually operated clockwise from the position illustrated in FIGURE 11 to that illustrated in FIGURE 12, the rock shaft 261 and eccentric 270 mounted thereon rotate to move the eccentric strap 271 toward the left to permit the impression rollers 19 and 21 to disengage the drum 18 and moistening roller 20, respectively. Such disengagement of the impression roller 19 and pressure roller 21 during idle periods of the machine prevents deformation of the relatively soft rollers.

*Paper feed table*

The paper feed table T mounted on the front of the machine is shown in detail in FIGURES 15 to 17. The table T has spaced side plates adjustable laterally relative to each other and in unison. Control fingers at one end of each side plate are operable individually or simultaneously for controlling the feed of paper from either or both sides of the sheets. When thin paper is fed into the machine, it is desirable to use both control fingers, but when heavier paper or cards are to be used a single control finger is sufficient.

Table T comprises a flat top plate 275 having depending flanges 276 and 277 at each side and depending flanges 278 at the front and rear. A bracket plate 279 is attached to the rearward end of each flange 276 and 277 and each bracket plate has a rearwardly projecting hook 280 and an inwardly projecting lug 281, see FIGURE 16. The table T is mounted on frame 15 by engaging the hooks 280 with pins 282 projecting outwardly from each side plate 16 and 17, see FIGURE 7. The lugs 281 then engage the front edge of the side plates 16 and 17 to position the flat plate 275 horizontally at the front of the machine.

Referring to FIGURES 15, 16 and 17, the flat top plate 275 has a transverse slot 283 formed therein which extends throughout substantially its entire width. Underlying the slot 283 is a shaft 284 having its ends projecting through aligned holes in the depending side flanges 276 and 277. One end of shaft 284 is threaded at 285 and extends through an adjusting nut 286 rotatably mounted in the depending flange 277. Thus, by turning nut 286 the entire shaft 285 moves longitudinally and transversely relative to the table.

Side plates 287 and 288 for holding a stack of copy sheets S in alignment therebetween project vertically from the top plate 275 of the paper feed table and have inwardly projecting horizontal flanges 289 and 290 resting on the top of the table. Each horizontal flange 289 and 290 has an inverted U-shaped bracket 291 depending therefrom through the slot 283 and closely fits the sides thereof, see FIGURES 16 and 17 to position the side plates in parallel relationship at right angles to the slot. Shaft 284 extends through aligned holes in the depending legs 292 and 293 of each bracket.

As shown most clearly in FIGURE 17, a latch plate 294 overlies the cross bar 295 of each bracket 291 with an end projecting laterally beyond the bracket and downwardly to provide a spring latch finger 296 yieldingly engaging the top of shaft 284. Each latch finger 296 holds its respective side plate 287 and 288 in position on the table top plate 275. An actuating handle arm 297 has one end attached to the side of the spring latch finger 296 and projects upwardly and outwardly at its ends to provide a finger grip 298 spaced from the side plate 287 or 288. By pinching the finger grip 298 toward its side plate 287 or 288 the spring latch finger 296 is flexed away from shaft 284 to permit the side plates to be slid laterally on the shaft. Thus, either side plate may be easily and quickly adjusted toward or away from each other for engagement with the sides of a stack of copy sheets of any width and to align the copy sheets with the master sheet at any position across the table. Furthermore, by rotating nut 286, the shaft 284 and side plates 287 and 288 may be moved bodily to obtain the desired alignment with the master sheet.

The control fingers 299 and 300 for controlling the feed of copy sheets S from a stack of sheets S mounted on the table comprise thin narrow detents overlying the rear of the table and projecting forwardly. Each control finger 299 and 300 projects laterally and forwardly from the end of an arm 301 and 302 mounted adjacent to the outside face of the respective side plates 287 and 288. The opposite or forward end of each arm 301 and 302 is pivotally mounted on a pin 303 projecting laterally from its respective side plate 287 or 288. The arms 301 and 302 are in the form of sheet metal plates having laterally projecting finger handles or tabs 304 at their lower edges adapted to rest on the table plate 275. The flanges 305 project beyond the table top and then downwardly in an arc about the pivot pins 303 and have inwardly projecting abutment feet 306.

A U-shaped actuating bail 307 has a transverse bar 308 underlying the abutment feet 306 of the respective arms 301 and 302. Arms 309 and 310 project forwardly from the ends of bar 308 and their ends are pivotally mounted on shaft 284 adjacent its ends. One of the arms 310 of the bail 307 has a pin 311 projecting laterally through an arcuate slot 312 in the side flange 277 depending from the top plate 275 of the table.

After a stack of copy sheets is mounted on the table T, either arm 301 or 302 may be lifted individually to position its detent control finger 299 or 300 on the top sheet S of a stack or the bail 307 may be lifted by handle pin 311 to lift both detent control fingers onto the top sheet. During such lifting movement the edges of the copy sheets yield and flap by the detents. During rotation of the friction roller 139 of the paper feed mechanism 24, the top sheet S of the stack slips with respect to the next lowermost sheet until the end of the sheet pulls out from under the control fingers 299 and 300 while holding the remainder of the sheets of the stack from advancing with the top sheet.

*Mode of operation*

To adjust the machine from an idle to operating condition, control lever 28 is manually actuated to the position shown in FIGURE 11.

Such operation of lever 28 raises the plate 202, see FIGURE 13, bracket 201 attached thereto and a reservoir vessel 29 mounted thereon to the position illustrated in FIGURE 14. The bottom of the reservoir vessel 29 engages stem 215 and lifts the valve 213 against the action of the spring 214 to permit liquid to flow from the supply tank 48 into the reservoir vessel. When the level of the liquid rises in the reservoir vessel 29 above the highest point in the valve outlet port 212, it seals the outlet and prevents the flow of air to the tank 48. Such sealing of air outlet port 212 provides an air lock to prevent further flow of liquid from the tank. Thus, the liquid is maintained at a substantially constant level L in the reservoir vessel 28 by a slight rise and fall in the liquid with respect to the outlet port 212.

When the reservoir vessel 29 is in its raised position, illustrated in FIGURE 3, liquid flows by gravity into the trough 180 of the liquid supply tray 22 to wet the wick 23 with a solvent liquid. The solvent liquid, however, is not applied to the moistening roller 20 as the wick is retracted or out of contact therewith, see FIGURE 12.

Simultaneously with the raising of the reservoir vessel 28, the manual operation of lever 28 rocks shaft 261 and eccentric 270 thereon and operating through the eccentric strap 271 rocks the impression roller 19 into contact with the periphery of the drum 18. Such movement of the eccentric strap releases the cradle mounting the pressure roller 21 which is actuated by the spring 111, see FIGURE 4, to engage it with the moistening roller 20. Thus, the liquid feed mechanism 26 and rollers 19 and 21 are shifted from their idle to their operating position.

When the manually operable control bar 27 is moved to the initial set-up position illustrated in FIGURE 12 it rocks the paper feed friction roller to inoperative position, releases the liquid supply tray 22 to move wick 23 away from the moistening roller 20 and releases stopping lever 248. Stopping lever 248 is rocked by spring 256 to position its abutting end 251 in the path of the arm 75 projecting from the cam lever 72. Clockwise movement of the drum 18 then causes the cam lever 72 to engage the abutment and rock relative to the drum, as shown in FIGURE 12. Such relative movement of the cam lever 72 and drum 18 causes the cam face 71 to rock the arm 69, shaft 68, and arm 69 at the opposite end of the drum to raise the clamping bar 61 against the action of spring 64 to releasing position. The drum 18 is then in condition to receive the master sheet.

The master sheet is applied to the drum 18 by inserting its end between the vertical offset shoulders 62 and 63 on the drum and clamping bar 61. After the end of the master sheet has been inserted between the clamping bar 61 and the side of the slot 60 in the drum, the latter is rotated counterclockwise to release the cam lever 72 from engagement with the abutment 251. Spring 64 then moves the clamping bar 61 radially inward to clamp the end of the master sheet between the sides of the bar and slot 60. Rotation of drum 18 will then cause the master sheet to rotate therewith.

Referring to FIGURES 5 and 6, the drum 18 is adjusted relative to the driving sleeve 80 to produce any desired line registry of the master sheet and copy sheets. This adjustment is made by withdrawing the latch 85 on the handle H against the action of the spring 90 to release the teeth 89 at the end of the latch from engagement with the teeth 59 on the hub 58 of the drive shaft 55 for the drum 18. The handle arm 81 and drive sleeve 80 then may be rotated relative to the shaft 55 to adjust the time at which the moistening roller 20 and the friction roller 139 of the paper feed mechanism are operated relative to the clamped end of the master sheet. Thus, by advancing or delaying the time at which the copy sheets S are fed relative to the movement of the master sheet, any line registry may be obtained as each tooth on the hub corresponds to a line on the master sheet. To facilitate such adjustment of the relative alignment of the master and copy sheets, the dial 93 at the end of the shaft 55 has an index corresponding to the teeth which cooperates with an index mark on the handle sheath 95 to show the number of lines on the copy sheet above or below the forward end of the master sheet. If it is desired to split a line, the pin 86 may be turned to produce any adjustment between a line.

After the master sheet has been applied to the drum 18 and the paper feed mechanism 24 adjusted, a stack of copy sheets S is mounted on the table T. To initiate operation of the machine, the manually operable control bar 27 is rocked from the position illustrated in FIGURE 12 to that illustrated in FIGURE 11. Handle 81 then is rotated counterclockwise to rotate drum 18 and the master sheet applied thereto and actuate the paper feed mechanism 24 to advance successive copy sheets into engagement therewith.

Rocking of the manually operable control bar 27 from the position shown in FIGURE 12 to that shown in FIGURE 11 causes the depending flange 221 to release the lugs 148 on the forwardly projecting arm 136 of the paper feeding mechanism which rocks on the square shaft 132 to engage the friction roller 139 with the upper sheet of the stack of copy sheets. Rocking movement of the cam face 227 on the control bar 27 releases the arm 240 which is rocked counterclockwise as viewed in FIGURE 4 by the spring 243. Such rocking of the arm 240 engages pin 244 with the radially projecting arm 195 of the liquid supply tray 22 and, in turn, rocks the tray counterclockwise to yieldingly engage the end of the wick 23 with the periphery of the moistening roller 20. Simultaneously, the cam pin 255 at the opposite end of the control bar 27 rocks the stopping lever 248 from the position shown in FIGURE 12 to that shown in FIGURE 11 out of the path of movement of the cam lever 72 at the end of the drum 18.

Counterclockwise rotation of the handle 81 and driven sleeve 80 as viewed in FIGURE 7 rotates drum 18 and the cams 83 and 84 simultaneously. Cam 83 operates through the cam follower lever 120 and segment gear 125 at its end to rotate the moistening roller 20 counterclockwise, and cam 84 acting through the follower lever 150 and segment gear 155 to the square shaft 132 counterclockwise. Rotation of the square shaft 132 is transmitted through the gears 144, 145 and 146 as shown in FIGURE 2 to rotate the friction roller 139 counterclockwise. Such rotation of the friction roller advances the top copy sheet of the stack over the guide 159 and into the bight between the moistening roller 20 and cooperating pressure roller 21. The operation of the friction roller 139 and moistening roller 20 are so coordinated by adjusting handle 81 relative to drum shaft 55 that the moistening roller advances the sheet into the bight between the drum 18 and impression roller 19 to give the desired line registry with the master sheet on the drum 18.

During the feeding of the copy sheet, solvent liquid supplied to the moistening roller 20 by the wick 23 is applied to the top surface of the copy sheet which will contact the master sheet. Thus, the wetted surface of the copy sheet engaging the master sheet dissolves a portion of the carbon thereon and transfers it to the copy sheet to make a reproduction thereon. After the forward end of a copy sheet S is engaged between the periphery of the drum 18 and the impression roller 19, the copy sheet is advanced by the drum into the receiving tray and the one way clutch rollers 104 and 142 permit movement of the moistening roller 20 and paper feed friction roller 139 relative to their drive shafts. Furthermore, the one way clutch for the friction roller 139 permits the segment gears 125 and 155, see FIGURE 7, to move through a return idle stroke without moving the rollers. Thus, the machine operates to advance successive sheets, moisten one side of the sheets and engage the moistened side of the sheets with the master sheet on the periphery of the drum 18.

When it is desired to insert another master sheet for a different run of copies, the manually operable control bar 27 is rocked from the operating position shown in FIGURE 11 to the set-up position illustrated in FIGURE 12 as previously explained. The first master sheet then may be removed by rotating the drum 18 clockwise relative to the cam lever 72 to actuate the clamping bar 61 to releasing position. A new master sheet then may be applied to the drum 18 as previously explained. The elements are shifted to a running position by rocking the manually operable control bar 27 back from the set-up position illustrated in FIGURE 12 to the running position illustrated in FIGURE 11. Because of the auxiliary control lever 231, the control bar 27 can be shifted manually from either the front or rear of the machine to facilitate operation thereof by either right-handed or left-handed persons positioned at either end of the machine.

When the machine is to remain idle for a period of time, the manually operable lever 28 is shifted from the position illustrated in FIGURE 11 to that illustrated in FIGURE 12. Such operation of the control lever 28 lowers the reservoir vessel 29 below the trough 180 of the liquid supply tray 22 so that solvent liquid will flow from the trough to the reservoir vessel. Simultaneously, the relatively soft impression roller 19 and pressure roller 21 are moved out of contact with the drum 18 and moistening roller 20, respectively, so as to avoid a permanent deformation or set in the rollers. Preferably, the control bar 27 also is actuated to the position shown in FIGURE 12 during idle periods to disengage the wick 23 from the moistening roller 20.

While a single embodiment of the invention is herewith illustrated and described, it will be understood that modifications may be made in the construction and arrangement of elements without departing from the spirit or scope of the invention. Therefore, without limitations in this respect, the invention is defined by the following claims.

I claim:

1. In a duplicating machine, the combination of a frame, a drum mounted to rotate in said frame, means to rotate said drum, means on said drum for clamping one end of a master sheet thereto for rotation therewith, means for operating the clamping means, an impression roller mounted to move on the frame to yieldingly bear against the periphery of said drum, a moistening roller mounted to rotate adjacent said drum, a wick for supplying a liquid to said moistening roller, a reservoir vessel for supplying liquid to said wick, a paper feeder for advancing successive sheets from a stack of sheets to said moistening roller where they are moistened by the liquid and thereafter advanced into the bight between said drum and impression roller, a shaft to which the drum is attached for rotation therewith, a driving element having a cam and mounted on the shaft for angular adjustment relative to said shaft and drum, means for connecting the shaft and driving element comprising a series of angularly spaced teeth on one of the parts and a manually operable latch mounted to slide radially on the other part for connecting the element in any desired angular relationship to the drum for rotation therewith as a unit, means driven by said driving element and connected to rotate the moistening roller relative to the wick and the paper feeder, means driven by the driving element and connected to operate the paper feeder in the same time relation with the moistening roller at any angular adjustment of the driving element relative to the drum to adjust the position of the sheet to be printed relative to the master sheet on said drum, means pivotally mounting the wick on the frame for rocking movement toward and away from the moistening roller, means mounting the reservoir vessel on the frame for movement relative to the wick to control the supply of liquid to the wick, means adjacent the wick for pivotally mounting the paper feeder on the frame for rocking movement from an operative position on the stack of paper sheets to a raised inoperative position away from the stack of sheets, and a single manually operable control mounted on the frame for simultaneously actuating the paper feeder, the wick and clamp operating means to operative and inoperative positions comprising a control bar extending between the side plates with its ends pivotally mounted thereon, said control bar having a lever projecting from one side to provide a handle for rocking the bar, and means on the bar for engaging the paper feeder, the wick and clamp operating means.

2. A duplicating machine in accordance with claim 1 in which a single control element is mounted on the frame for actuating the impression roller and reservoir vessel simultaneously to operative and inoperative positions.

3. In a duplicating machine, the combination of a frame having spaced side plates, a drum mounted to rotate between the side plates, means on said drum for clamping one end of a master sheet thereto for rotation therewith, an impression roller cooperating with said drum, means for feeding successive copy sheets between the master sheet on said drum and the impression roller, said feeding means comprising a shaft extending between and mounted to rotate on the side plates, an arm pivotally mounted to rock on the shaft and having a lug projecting therefrom, said arm being mounted to slide along the shaft to any adjusted position between the side plates, a friction element mounted to rotate on the arm and rock with the arm toward and away from the top sheet of a stack of sheets, a manually operable control bar extending between and mounted to rock on the spaced side plates of said frame, and a forwardly extending flange on the control bar overlying the arm to engage the lug projecting therefrom and rock the arm and friction element thereon away from the top sheet of the stack at any position of the arm along the shaft.

4. A duplicating machine in accordance with claim 3 in which the control bar extending between the side plates of the frame has arms at each end, said arms being pivotally mounted intermediate their ends on the side plate of the frame to mount the bar for rocking movement, and a handle projecting from one of said arms to adapt the bar to be manually actuated.

5. A duplicating machine in accordance with claim 4 in which the friction element is a roller mounted to rotate on said arm in contact with the top sheet of said stack, and gearing connected to rotate said friction roller to advance the top sheet from said stack.

6. A duplicating machine in accordance with claim 4 in which the paper feeding means comprises a friction roller mounted to rotate on said arm, intermeshing spur gears rotatably mounted on said arm to rotate said friction roller from said shaft, one of said intermeshing gears being mounted to slide along said drive shaft and locked thereto for rotation therewith to adapt the arm to slide bodily to any position between the spaced side plates of the frame, and said forwardly projecting flange on the control bar engaging said lug to rock the arm away from the top of the stack of sheets in any lateral position of the arm.

7. A duplicating machine in accordance with claim 3 in which the means on said drum for clamping the master sheet thereto comprises a bar movable relative to the drum to clamping and releasing positions, spring means for moving the bar to clamping position, a cam rotatable with said drum and movable relative thereto for actuating the bar to releasing position, and means operated by said control bar to actuate the clamping bar to releasing position upon relative movement between the cam and drum.

8. A duplicating machine in accordance with claim 3 in which a moistening roller extends between and is rotatably mounted in the spaced side plates of the frame, a wick mounted for movement toward and away from the moistening roller, and means actuated by said control bar to move the wick toward the moistening roller.

9. A duplicating machine in accordance with claim 9 in which the paper feeding means comprises the arm mounted to rock toward and away from the top of a stack of copy sheets and having a lug projecting from one side thereof for engagement movement by the control bar, the means for clamping the master sheet to the drum comprising a bar movable relative to the drum to clamping and releasing positions, a cam for actuating the clamping means, a moistening roller extending between and rotatably mounted in the side plates of the frame, a wick mounted to rock toward and away from the moistening roller, said control bar engaging the lug on the paper feeding means, a projection on one arm of said control bar for actuating the cam to operate the clamping means for the master sheet, and a cam on the other arm of said control bar for rocking the wick, and said control bar being manually operable to simultaneously rock the paper feeding arm away from the top of the stack of paper sheets, actuate the clamping means on the drum and release the wick to relieve the pressure on the moistening roller.

10. A duplicating machine in accordance with claim 4 in which the handle is formed at one end of a strap attached to one arm of the control bar, said handle projecting from one side of the machine, a dual lever pivotally mounted intermediate its ends on a side plate of the frame, a handle on the dual lever at the opposite side of the machine from the handle on the strap, and a pin and slot connection between the adjacent ends of the strap and dual lever.

11. A duplicating machine in accordance with claim 10, in which an over-center spring is connected between the adjacent ends of the strap and dual lever.

12. In a duplicating machine, a frame having spaced side plates, a drum mounted for rotation between said side plates of the frame, an impression roller cooperating with said drum, means for mounting the impression roller for movement toward and away from said drum, a moistening roller adjacent said drum, a liquid supply tray, a wick in said tray for contacting the moistening roller, a reservoir vessel, a bracket supporting the reservoir vessel, means on one of the side plates of the frame for mounting the bracket and reservoir vessel to slide vertically on the frame plate, a flexible fluid connection between said reservoir vessel and liquid supply tray, manually operable means mounted on one side of said one side plate for moving the impression roller toward and away from the drum, and means connecting the bracket and manually operable means mounted on the side plate for simultaneously raising the bracket and reservoir vessel mounted thereon to supply liquid to the moistening roller and move the impression roller into engagement with the drum.

13. A duplicating machine in accordance with claim 12 in which a moistening back-up pressure roller is provided which cooperates with the moistening roller, means for mounting the pressure roller for movement toward and away from the moistening roller, and said means for moving the impression roller into and out of engagement with the drum being connected to move the pressure roller into and out of engagement with the moistening roller.

14. A duplicating machine in accordance with claim 13 in which the impression roller and moistening backup pressure roller are resilient, and the means for moving the impression roller and pressure roller into and out of engagement with the drum and moistening rollers, respectively, varies the pressure between the impression roller and drum.

15. In a duplicating machine, a frame having spaced side plates, a dum mounted for rotation between the side plates of the frame, an impression roller cooperating with said drum, a moistening roller adjacent said drum, a liquid supply tray, a wick mounted in said tray with one edge projecting therefrom for contacting the moistening roller, a reservoir vessel, said reservoir vessel having a supporting structure mounted to slide on one of said side plates, one of the side plates of the frame having a slot therein, said reservoir vessel having a pin projecting through the slot in the side plate of the frame, a flexible connection between said reservoir vessel and tray, and a manually operable lever pivotally mounted on the opposite side of the side plate and having a cam slot therein through which the pin from the reservoir vessel projects whereby manual rocking of the lever raises and lowers the reservoir vessel above and below the bottom of the tray to control the flow of liquid to the wick.

16. A duplicating machine in accordance with claim 15 in which the impression roller is rotatably mounted in a cradle, said cradle being mounted to rock on the side plates of the frame, a rock shaft extending between the side plates of the frame, an eccentric on said shaft, an eccentric strap connected between said eccentric and said cradle, and said manually operable lever for raising and lowering the reservoir vessel being connected to said rock shaft to move the impression roller toward and away from the drum and vary the pressure therebetween.

17. A duplicating machine in accordance with claim 15 in which a moistening back-up roller is provided for cooperation with the moistening roller, each of said impression and pressure rollers being rotatably mounted in separate cradles, said cradles being mounted to rock on the spaced side plates of the frame, means including a spring for rocking the cradle mounting the pressure roller toward the moistening roller, a rock shaft extending between the side plates of the frame, an eccentric on said shaft, an eccentric strap connected between said eccentric and said cradle mounting the impression roller, said manually operable lever for raising and lowering the reservoir vessel being connected to rock said shaft and through said eccentric strap rock the impression roller toward and away from said drum, and the end of the eccentric strap engaging the cradle mounting the pressure roller for rocking the latter away from the moistening roller against the action of the spring.

18. A duplicating machine in accordance with claim 15 in which a tank of liquid is mounted on the side plate of the frame above the reservoir vessel, a valve in the tank having a depending stem, and an air vent in the valve above the bottom of the stem whereby the stem of the valve is actuated to open the valve when the reservoir vessel is raised to supply liquid to the vessel to the level of the air vent and close the valve and stop the flow of liquid when the vessel is lowered.

19. A duplicating machine in accordance with claim 18 in which the valve comprises a housing having an outlet port, a valve seat in the housing above the lower end of the outlet port, a valve in the housing cooperating with the valve seat, and the air vent being located in the side of the housing above the lower end of the outlet port to break capillarity in the port.

20. A duplicating machine of the type having spaced side plates, a rotatable drum mounted to rotate on and between the side plates and on which a master sheet is clamped and to which copy sheets are fed to obtain an impression from the master sheet, the combination with the elements of such a machine of a moistening roller over which the sheets of paper are fed to moisten the sheets, a liquid supply tray, a wick in said liquid supply tray, means for mounting said liquid supply tray for movement toward and away from the moistening roller to engage the wick with and disengage the wick from the moistening roller, said tray having an arm projecting upwardly therefrom, a manually operable bar extending between and mounted to rock on the spaced side plates and having a cam projecting therefrom, a handle projecting from said bar for manually rocking the bar, and means including the cam on said bar and connected to operate the arm projecting upwardly from the tray to actuate the tray toward and away from said moistening roller.

21. A duplicating machine in accordance with claim 15 comprising, means for mounting the moistening roller for rotation in the frame, the liquid supply tray having a trough therein, said wick being mounted in said trough and extending throughout the length of the moistening roller with its edge projecting from the trough, means for pivotally mounting said tray on said frame to rock the wick toward and away from the moistening roller, an arm projecting from said liquid supply tray, and said manually operable means comprising a cam mounted on said frame for actuating said arm to rock the liquid supply tray.

22. In a duplicating machine, a frame having spaced side plates, a drum mounted on the side plates for rotation therebetween, an impression roller adjacent the drum, a moistening roller adjacent the drum, paper feeding means having a shaft journaled in the side plates, the bearings for said shaft projecting inwardly from the side plates, at least one of said bearings having a conical surface terminating in a flat face, a liquid supply tray in the form of a cradle having end plates, a wick mounted in the liquid supply tray with one edge projecting therefrom, openings in the end plates of the liquid supply tray for mounting the cardle to rock on the inwardly directed bearings, the end plate of the tray mounted on the bearing having a conical surface being provided with a latch for engagement with the flat face to properly position the tray thereon, and means for rocking the liquid supply tray on the bearings to engage the wick with the moistening roller.

23. In a duplicating machine, a frame having spaced side plates, aligned bosses projecting from the spaced side plates, at least one of said bosses being conical and having a vertical face adjacent its larger end, a liquid supply tray in the form of a cradle having a longitudinally extending trough with upwardly projecting plates at each end, each of said plates having a slotted opening therein for mounting the tray on the aligned bosses, the opening in one of the plates being movable along the tapered boss to properly position the tray on the frame, and a latch on said plate for engaging the face adjacent the tapered boss to lock the tray in position on the frame.

24. In a duplicating machine, a moistening roller, a wick extending throughout the length of the moistening roller, means for supplying liquid to the wick, and means for mounting the wick for movement bodily toward and away from the moistening roller and for rocking movement relative to the moistening roller, said means for mounting the wick comprising a trough mounted for movement toward and away from the moistening roller and having a slot therein, a wick holder mounted in the slot and having opposed bearing lugs engaging the trough at opposite sides of the slot.

25. In a duplicating machine, a frame, a moistening roller mounted to rotate in said frame, a liquid supply tray having a trough extending throughout the length of the moistening roller, a wick holder in said trough, a wick in said wick holder having an edge projecting from the wick holder and trough, said liquid supply tray being mounted to rock on said frame to bodily move the wick toward and away from the moistening roller, and said wick holder having bearing lugs projecting from the sides thereof intermediate its ends and overlying the top edge of the trough to rock on the latter for engaging the moistening roller throughout its length.

26. In a duplicating machine, a drum to which a master sheet is attached for rotation therewith, an impression roller cooperating with said drum, paper feed means having an element for advancing the top sheet from a stack of paper sheets, a shaft for rotating the drum and having a hub, a sleeve mounted to turn on the shaft, means driven by the sleeve and connected to operate the paper feeding means in timed relation to the rotation of the drum, said hub on the shaft and sleeve having releasable connecting means for relatively adjusting the parts comprising notches on one of the parts angularly spaced to correspond with the spacing of the lines on the master sheet and a manually operable latch on the other part, said manually operable latch and part on which it is mounted having interengaging structures to provide a driving connection while permitting radial sliding movement of the latch on said part, a spring connected between the latch and part on which it is mounted to move the latch inwardly, a handle on the latch for moving it outwardly against the action of the spring, said latch having at least one detent for engaging any one of the notches on the other part for locking the shaft and sleeve for rotation as a unit whereby to adjust the time a sheet is fed relative to the position of the master on the drum for producing any desired line registry.

27. A duplicating machine in accordance with claim 26 in which the hub on the shaft has a series of teeth angularly spaced to correspond with the spacing on the lines of the master sheet, the sleeve having a handle, the latch being mounted to slide on the handle, and the spring yieldingly holding the latch in engagement with the hub between adjacent teeth while permitting manual retraction of the latch to adjust the registry of the sheet to be printed with the master sheet.

28. A duplicating machine in accordance with claim 27 in which the hub on the shaft and the handle on the sleeve have a cooperating scale and index to indicate the number of lines in either direction from normal registry.

29. A duplicating machine in accordance with claim 27 in which the latch is in the form of a plate mounted to slide on the handle, spaced pins extending through aligned openings in the handle and latch plate, an eccentric bearing on one pin engaging the opening in one of the handle and latch elements whereby rotation of the pin having the eccentric rocks the latch and handle elements relative to each other to provide a micro-adjustment between lines.

30. A duplicating machine in accordance with claim 26 in which the sleeve has a cam fixed thereto, and the means driven by the sleeve comprising an oscillating lever operated by the cam.

31. A duplicating machine in accordance with claim 26 in which the element of the paper feeding means for advancing the top sheet of a stack comprises a friction roller resting on the top sheet of the stack, a cam on the sleeve, an oscillating lever actuated by the cam and having a segment gear, gearing connecting the segment gear and friction roller, and a one way clutch in the gearing to positively drive the friction feed roll upon oscillation of the lever in one direction while permitting relative movement in the opposite direction.

32. A duplicating machine in accordance with claim 26 in which a moistening roller is provided for moistening the paper, the sleeve having a plurality of adjacent cams, and the means driven by the sleeve comprising gearing actuated by the cams and connected to drive the paper feeding means and moistening roller.

33. A duplicating machine in accordance with claim 26 in which a moistening roller is provided for moistening the paper, the element of the paper feeding means for advancing the top sheet of a stack of sheets comprises a friction roller resting on the top sheet of the stack, cams on the sleeve, oscillating levers actuated by the cams and having segment gears, gearing connecting each of the levers to the friction roller of the paper feeding means and moistening roller, respectively, and a one way clutch in each gearing to positively drive the friction feed roller and moistening roller upon oscillation of the levers in one direction while permitting relative movement in the opposite direction.

34. In a duplicating machine, the combination of a frame; a drum mounted to rotate on said frame; means on said drum for clamping one end of a master sheet thereto for rotation therewith comprising a bar movable relative to the drum to clamping and releasing positions, a spring for moving the bar to clamping position, a cam rotatable with said drum and movable relative thereto for actuating the bar to releasing position and an abutment for actuating said cam relative to said drum during movement of the latter; an impression roller cooperating with said drum; a moistening roller adjacent said drum; driving means including a shaft fixed to said drum and means operatively connecting said shaft and moistening roller for positively rotating said drum and moistening roller in timed relation; means for feeding successive sheets of paper over said moistening roller and between said drum and impression roller comprising an arm mounted to rock toward and away from the top of a stack of paper sheets, a friction roller mounted to rotate on said arm and gearing connected to rotate said friction roller to advance the top sheet of said stack; a wick for supplying a liquid to the moistening roller and mounted on said frame for movement toward and away from said moistening roller; and manually operable control means separate from the driving means and mounted for movement on the frame and connected to simultaneously actuate the wick and friction element to operative and inoperative positions comprising a control bar mounted to rock on said frame, said control bar being constructed and arranged to actuate the arm on the paper feed means to move the friction roller away from the top of said stack of sheets, actuate the abutment into position for engagement with the cam for actuating the bar for clamping a master sheet to the drum and releasing the wick for movement away from the moistening roller whereby to adapt the drum to be operated without advancing copy sheets or supplying liquids to the moistening roller.

References Cited in the file of this patent

UNITED STATES PATENTS

| | | |
|---|---|---|
| 2,036,972 | Storck | Apr. 7, 1936 |
| 2,204,715 | Wimmer | June 18, 1940 |
| 2,231,639 | Ritzerfeld | Feb. 11, 1941 |
| 2,364,942 | Bradt | Dec. 12, 1944 |
| 2,622,518 | Peterson et al. | Dec. 23, 1952 |
| 2,622,519 | Keil | Dec. 23, 1952 |
| 2,660,113 | Gullixson et al. | Nov. 24, 1953 |
| 2,717,549 | Keil | Sept. 13, 1955 |
| 2,722,886 | Keil | Nov. 8, 1955 |
| 2,745,340 | Ritzerfeld et al. | May 15, 1956 |
| 2,785,893 | Ford et al. | Mar. 19, 1957 |
| 2,830,534 | Springer et al. | Apr. 15, 1958 |
| 2,895,416 | Mazzio et al. | July 21, 1959 |